US012592125B2

(12) United States Patent

Remus et al.

(10) Patent No.: US 12,592,125 B2

(45) Date of Patent: Mar. 31, 2026

(54) PARTIAL RESET OF DYNAMIC AWARDS

(71) Applicant: IGT, Las Vegas, NV (US)

(72) Inventors: Kevin Remus, Las Vegas, NV (US); Jennifer Hatok, Reno, NV (US)

(73) Assignee: IGT, Las Vegas, NV (US)

( * ) Notice: Subject to any disclaimer, the term of this patent is extended or adjusted under 35 U.S.C. 154(b) by 457 days.

(21) Appl. No.: 17/942,870

(22) Filed: Sep. 12, 2022

(65) Prior Publication Data

US 2024/0087412 A1 Mar. 14, 2024

(51) Int. Cl.
*G07F 17/32* (2006.01)

(52) U.S. Cl.
CPC ...... *G07F 17/3258* (2013.01); *G07F 17/3211* (2013.01)

(58) Field of Classification Search
CPC .......................... G07F 17/3258; G07F 17/3211
See application file for complete search history.

(56) References Cited

U.S. PATENT DOCUMENTS 6,612,928 B1 * 9/2003 Bradford ................ G06F 21/32 463/29
7,297,059 B2 11/2007 Vancura et al.
7,651,392 B2 1/2010 Pennington et al.
8,147,320 B2 4/2012 Englman et al.
8,267,777 B2 9/2012 Jaffe
8,342,956 B2 1/2013 Anderson
8,353,753 B2 1/2013 Thomas
8,506,391 B2 8/2013 Jaffe et al.
9,275,510 B2 3/2016 Anderson et al.
9,293,007 B2 3/2016 Pawloski et al.
9,401,066 B2 7/2016 De Waal et al.
10,467,855 B2 11/2019 Wolf et al.
10,580,257 B2 3/2020 Berman et al.
11,011,025 B2 5/2021 Pierer
11,380,164 B2 7/2022 Hughes et al.
2004/0097285 A1 * 5/2004 Fisher ..................... G07F 17/32 463/24
2007/0218975 A1 9/2007 Iddings et al.
2014/0228103 A1 8/2014 Belger et al.
2015/0262457 A1 9/2015 Jhanb
2020/0242885 A1 * 7/2020 Culp .................. G07F 17/3241

* cited by examiner

*Primary Examiner* — Werner G Garner

(74) *Attorney, Agent, or Firm* — Neal, Gerber & Eisenberg LLP

(57) ABSTRACT

Gaming systems and methods that determine a partial dynamic award based on the accumulation of one or more game elements and reset a dynamic award based on the determined partial dynamic award.

20 Claims, 12 Drawing Sheets

PARTIAL RESET OF DYNAMIC AWARDS

BACKGROUND

In various embodiments, the systems and methods of the present disclosure determine a partial dynamic award based on the accumulation of one or more game elements and reset a dynamic award based on the determined partial dynamic award.

Gaming machines may provide players awards in primary games. Gaming machines generally require the player to place or make a wager to activate the primary or base game. The award may be based on the player obtaining a winning symbol or symbol combination and on the amount of the wager.

BRIEF SUMMARY

In certain embodiments, the present disclosure relates to a gaming system including a processor, and a memory device that stores a plurality of instructions. When executed by the processor, the instructions cause the processor to cause a display, by a display device, of a progressive award including a plurality of single-digit values that form a multi-digit value. In these embodiments, when executed by the processor responsive to an occurrence of a progressive award modification event, the instructions cause the processor to modify at least one of the single-digit values of the multi-digit value. When executed by the processor responsive to an occurrence of a partial progressive award triggering event, the instructions cause the processor to determine a value of a partial progressive award, the value being based on at least one, but less than all, of the single-digit values of the multi-digit value, cause a display, by the display device, of the value of the partial progressive award, and further modify, based on the value of the partial progressive award, the multi-digit value.

In certain embodiments, the present disclosure relates to a gaming system including a processor, and a memory device that stores a plurality of instructions. When executed by the processor, the instructions cause the processor to cause a display, by a display device, of a first value of a progressive award, the first value being a first reset value. In these embodiments, when executed by the processor responsive to an occurrence of a progressive award increase event, the instructions cause the processor to cause a display, by the display device, of a second value of the progressive award, the second value being greater than the first value. When executed by the processor responsive to an occurrence of a partial progressive award triggering event when the progressive award includes the second value, the instructions cause the processor to determine a third value of the progressive award, cause a display, by the display device, of the third value of the progressive award, and thereafter, cause a display, by the display device, of a fourth value of the progressive award, the fourth value of the progressive award being a second reset value greater than the first value of the progressive award and based on the second value of the progressive award modified by the third value of the progressive award.

In certain embodiments, the present disclosure relates to a gaming system including a processor, and a memory device that stores a plurality of instructions. When executed by the processor, the instructions cause the processor to cause a display, by a display device, of a first award, wherein a first quantity of single-digit value form the first award. When executed by the processor responsive to each occurrence of a game element accumulation event associated with a game, the instructions cause the processor to accumulate a game element associated with a single-digit value. When executed by the processor responsive to an occurrence of a secondary game triggering event when a second quantity of single-digit values that form part of the first award correspond with single-digit values associated with accumulated game elements, the instructions cause the processor to determine a second award based on the second quantity of single-digit values that form part of the first award, the second quantity of single-digit values being less than the first quantity of single-digit values, and the second quantity of single-digit values that form part of the first award form the second award, cause a partial award triggering event to occur in association with the second award, and modify the first award based on the second award.

Additional features are described herein, and will be apparent from the following Detailed Description and the figures.

DETAILED DESCRIPTION

Figure 1A:
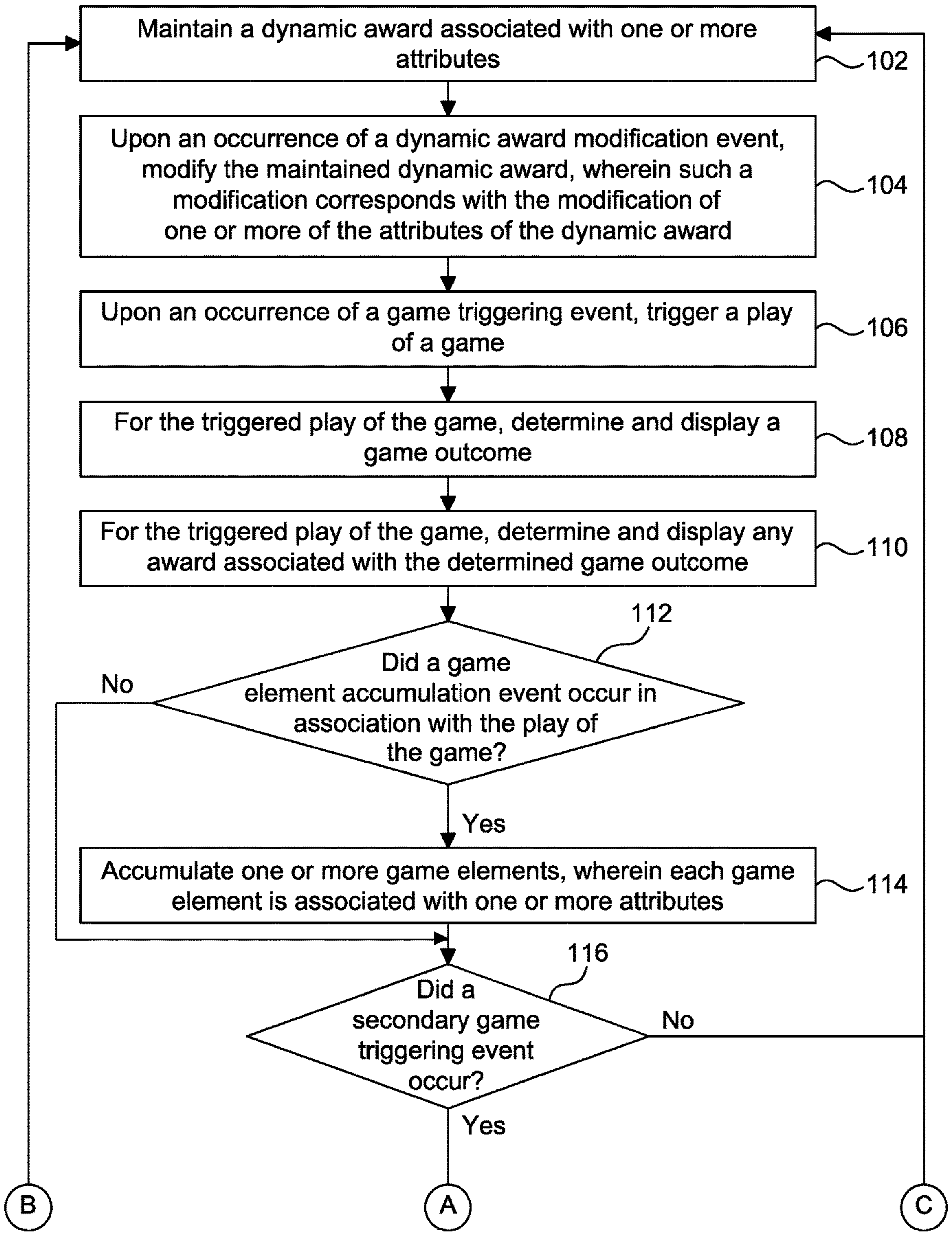
FIGS. 1A and 1B (collectively FIG. 1) are flow charts of an example process for operating a gaming system that accumulates game elements associated with attributes that collectively may match certain of the attributes of a dynamic award to determine a partial dynamic award and then modifies the dynamic award based on the partial dynamic award.

In various embodiments, the present disclosure relates generally to gaming systems and methods that maintain a first award and accumulate one or more game elements, such as individual single digit values, wherein zero, one or more accumulated game elements are redeemed to determine a second award that modifies the maintained first award.

In certain embodiments, the gaming system maintains a dynamic award associated with a plurality of attributes. In these embodiments, upon an occurrence of a dynamic award modification event, the gaming system alters or otherwise modifies one or more of the attributes associated with the dynamic award. As such, at different points in time, the dynamic award is associated with different attributes. For example, the dynamic award is a multi-digit value progressive award in which each of the respective values of each of the respective digits of the progressive award represents an individual attribute of that progressive award. In this example, upon a progressive award modification event, the gaming system modifies, such as increases, the value of that progressive award and thus modifies one or more attributes of the progressive award (e.g., increasing the singles digit of the progressive award from a value of three to a value of four modifies the value attribute of the singles digit of the progressive award).

In addition to maintaining the dynamic award, for a play of a primary game, the gaming system determines and displays a primary game outcome and any award associated with the primary game outcome. In these embodiments, in addition to a determination of a primary game outcome, the gaming system determines whether a game element accumulation event occurred in association with (or independent of) the play of the primary game. In different embodiments, such a game element accumulation event occurs based on, or alternatively independent of, one or more events displayed in association with the play of the primary game.

In certain embodiments, upon an occurrence of a game element accumulation event, the gaming system accumulates one or more game elements. Each accumulated game element is associated with an attribute of a plurality of different attributes that may or may not also be associated with the dynamic award. That is, based on the current state or configuration of the dynamic award, the static attribute associated with an accumulated game element may or may not match a variable attribute associated with the dynamic award. For example, the accumulated game element is associated with a value of four (i.e., the attribute of the game element) which may or may not be known to the user prior to an occurrence of a secondary game triggering event. In this example, if the maintained progressive award is also, at that point in time, associated with a value of four (i.e., at least one of the digits of the progressive award has a value of four), then, for at least that point in time, the maintained progressive award and the accumulated game attribute share an attribute. On the other hand, in this example, if the maintained progressive award is not, at that point in time, associated with a value of four (i.e., none of the digits of the progressive award currently have a value of four), then, for at least that point in time, the maintained progressive award and the accumulated game attribute do not share any attributes.

In addition to an accumulation of one or more game elements upon an occurrence of a game element accumulation event, the gaming system determines if a secondary game triggering event occurred in association with (or independent of) the play of the primary game. In different embodiments, such a secondary game triggering event occurs based on, or alternatively independent of, one or more events displayed in association with the play of the primary game.

If a secondary game triggering event occurred, the gaming system enables the redemption of zero, one or more accumulated game elements to obtain part or all of the dynamic award. In these embodiments, which, if any, accumulated game elements are redeemed and the individual attributes associated with such redeemed game elements (relative to the current attributes associated with the dynamic award) determines whether to provide none, part, or all of the maintained dynamic award. In other words, the determination to provide a partial dynamic award (i.e., a portion of the dynamic award), to provide the dynamic award or to continue maintaining the dynamic award (without providing any part of the dynamic award) is based on whether or not the attributes of the accumulated game elements match any of the attributes of the current state of the dynamic award.

In certain embodiments, if the individual or collective attributes of the accumulated game elements match certain of, but not all of, the attributes of the dynamic award, the gaming system determines to provide a partial dynamic award. For example, if a progressive award is currently valued at $123.45 (i.e., a dynamic award associated with the attributes of the single digit values of one, two, three, four and five) when the secondary game triggering event occurs and at that point in time, accumulated game elements are associated with the respective attributes of the single digit values of one, two, three and five, then the gaming system determines a partial progressive award of $12.35 based on the partial matching of attributes of accumulated game elements with attributes of the progressive award. Put differently, in this example, since the single digit value attributes of four accumulated game elements match four of the single digit values of the five single digit values that collectively form the progressive award, a partial progressive award triggering event occurs and the partial progressive award is won.

In certain embodiments, if the collective attributes of the accumulated game elements match each of the attributes of the dynamic award, the gaming system determines to provide the maintained dynamic award. For example, if a progressive award is currently valued at $123.45 when the secondary game triggering event occurs and at that point in time, at least five accumulated game elements are associated with the respective attributes of the single digit values of one, two, three, four and five, then the gaming system determines to provide the progressive award of $123.45. In this example, since the single digit value attributes of at least these five accumulated game elements match each of the single digit values of each of the digits of the progressive award, a progressive award triggering event occurs and the progressive award is won.

In certain embodiments, if the collective attributes of the accumulated game elements fail to match any of (or alternatively at least a designated quantity of) the attributes of the dynamic award, the gaming system determines not to provide the maintained dynamic award nor any partial dynamic award. In these embodiments, the gaming system continues to maintain the dynamic award (subject to modifications from dynamic award modification events occurring) until another secondary game triggering event occurs and another opportunity is provided to win part or all of the dynamic award. For example, if a progressive award is currently valued at $123.45 when the secondary game triggering event occurs and at that point in time, three accumulated game elements are associated with the respective values of seven, seven and six, then the gaming system determines not to provide the progressive award (based on not matching each of the digits of the progressive award to values of the accumulated game elements) nor any partial progressive award (based on not matching some, but not all, of the digits of the progressive award to values of the accumulated game elements). In this example, the gaming continues to maintain (and potentially subsequently modify) the progressive award at its current level until another opportunity arises to win part or all of the progressive award.

It should be appreciated that since the attributes of the dynamic award periodically change, the determination of whether or not to provide the maintained dynamic award or a determined partial dynamic award is based on the attributes of the accumulated game elements relative to the attributes of the dynamic award at the point in time of the occurrence of the secondary game triggering event. That is, when the secondary game triggering event occurs factors into which attributes are currently associated with the dynamic award and thus factors into whether or not to provide the dynamic award or any partial dynamic award.

In certain embodiments, following the determination to provide a partial dynamic award, the gaming system modifies the dynamic award based on the determined partial dynamic award. In these embodiments, rather than resetting the dynamic award to a predetermined reset value, the gaming system utilizes the amount of the partial dynamic award to modify the amount of the dynamic award. In other words, if a partial dynamic award triggering event occurs, the gaming system partially resets the dynamic award based, at least in part, on the determined partial dynamic award, wherein such a partial reset includes modifying one or more of the attributes of the dynamic award. For example, following a determination of a partial progressive award of $12.35 (based on the partial matching of attributes of accumulated game elements with attributes of the progressive award currently valued at $123.45), the gaming system reduces the value of the progressive award to $111.10 (i.e., $123.45-$12.35). In this example, the partial reset of the progressive award results in modifying the attributes associated with each of the digits of the multi-digit value progressive award except for the hundreds digit (which remained associated with a value of one). Following such a modification of the dynamic award with the determined partial dynamic award, the gaming system continues to maintain the dynamic award from the partially reset value.

In certain embodiments, following the determination to provide the dynamic award, the gaming system resets the dynamic award to a predetermined reset amount or value. In these embodiments, if a dynamic award triggering event occurs, the gaming system resets the dynamic award to a reset value, wherein such a reset includes modifying one or more of the attributes of the dynamic award. For example, following a determination, based on the matching of attributes of the accumulated game elements with each of the attributes of the progressive award currently valued at $123.45, the gaming system reduces the value of the progressive award to a reset value of $50.00. In this example, the reset of the progressive award results in modifying the attributes associated with each of the digits of the multi-digit value progressive award. Following such a resetting of the dynamic award, the gaming system maintains the dynamic award from this reset value.

Accordingly, the gaming system of the present disclosure employs game elements having static attributes and dynamic awards having variable attributes in the determination of whether or not to provide part or all of such dynamic awards. As such, the determination of whether or not to provide one or more awards, such as one or more progressive awards or one or more partial progressive awards, is based on not only the accumulation of game elements over one or more plays of a game, but also the timing of when a secondary game triggering event occurs and the current attributes associated with the dynamic award when such a secondary game triggering event occurs. Such a configuration of accumulating persistent game elements associated with certain attributes and utilizing variable attributes associated with a dynamic award modifies the volatility of the gaming system and thus alters the operation of the gaming system (relative to prior gaming systems that did not employ such variable attributes with any dynamic awards).

Additionally and unlike prior gaming systems that statically operated to, responsive to an award triggering event, reset the current value of the award to a reset value associated with the award known prior to the award triggering event, the gaming system of the present disclosure introduces a degree of randomness (e.g., whether to provide a partial award and/or an amount of the partial award) in the resetting of an award via utilizing a reset value unknown prior to the award triggering event. Moreover, the gaming system of the present disclosure alleviates another known problem with awards that grow in value over time only to be periodically reset to a relatively low value. That is, after such a reset, it often takes a substantial period of time for the award to climb back to a relatively high value, whereby certain users become discouraged because they do not find the award desirable (i.e., worth the cost of continuing to play) and/or they do not want to potentially wait a substantial period of time for the award to climb back to a relatively high value. In recognition of these problems, the retention, in certain instances, of at least part of the current value of the award following an award triggering event counteracts any fatigue encountered by users following prior occurrences of award triggering events. Such counteractions of this potential fatigue spur continued engagement with the gaming system which leads to a more efficient operation of the gaming system by reducing idle time whereby the gaming system still consumes power and generates heat without otherwise being used.

While certain embodiments of the present disclosure are directed to accumulating game elements in association with one or more plays of a primary game, it should be appreciated that such embodiments may additionally or alternatively be employed in association with accumulating game elements in association with one or more plays of a secondary game, such as a bonus game. Moreover, while certain embodiments of the present disclosure are directed to redeeming accumulated game elements for a dynamic award or partial dynamic award in association with one or more plays of a secondary game, it should be appreciated that such embodiments may additionally or alternatively be employed in association with redeeming accumulated game elements for a dynamic award or partial dynamic award in association with one or more plays of a primary game. Furthermore, while certain embodiments of the present disclosure are directed to accumulating and redeeming game elements for a dynamic award or partial dynamic award in association with a reel game, it should be appreciated that such embodiments may additionally or alternatively be employed in association with accumulating and redeeming game elements for a dynamic award or partial dynamic award in association with non-reel games, such as, but not limited to, card games (e.g., any suitable poker game, any suitable blackjack game, or any suitable Baccarat game), keno games, and bingo games.

Moreover, while certain embodiments of the present disclosure are directed to the gaming system accumulating and redeeming game elements for a dynamic award or partial dynamic award that are displayed by an electronic gaming machine ("EGM") such as a slot machine, a video poker machine, a video lottery terminal, a terminal associated with an electronic table game, a terminal associated with a live table game, a video keno machine, a video bingo machine and/or a sports betting terminal that also offers sports betting opportunities, it should be appreciated that such embodiments may additionally or alternatively be employed in association with the gaming system accumulating and redeeming game elements for a dynamic award or partial dynamic award that are displayed by a personal gaming device, such as desktop computers, laptop computers, tablet computers or computing devices, personal digital assistants, mobile phones, and other mobile computing devices that offer plays of wagering games (and in certain instances, sports betting opportunities), any suitable slot machine interface board which is in communication with an EGM, and/or any suitable combination of a server operating with an EGM, a slot machine interface board of an EGM and/or a personal gaming device.

Figure 1B:
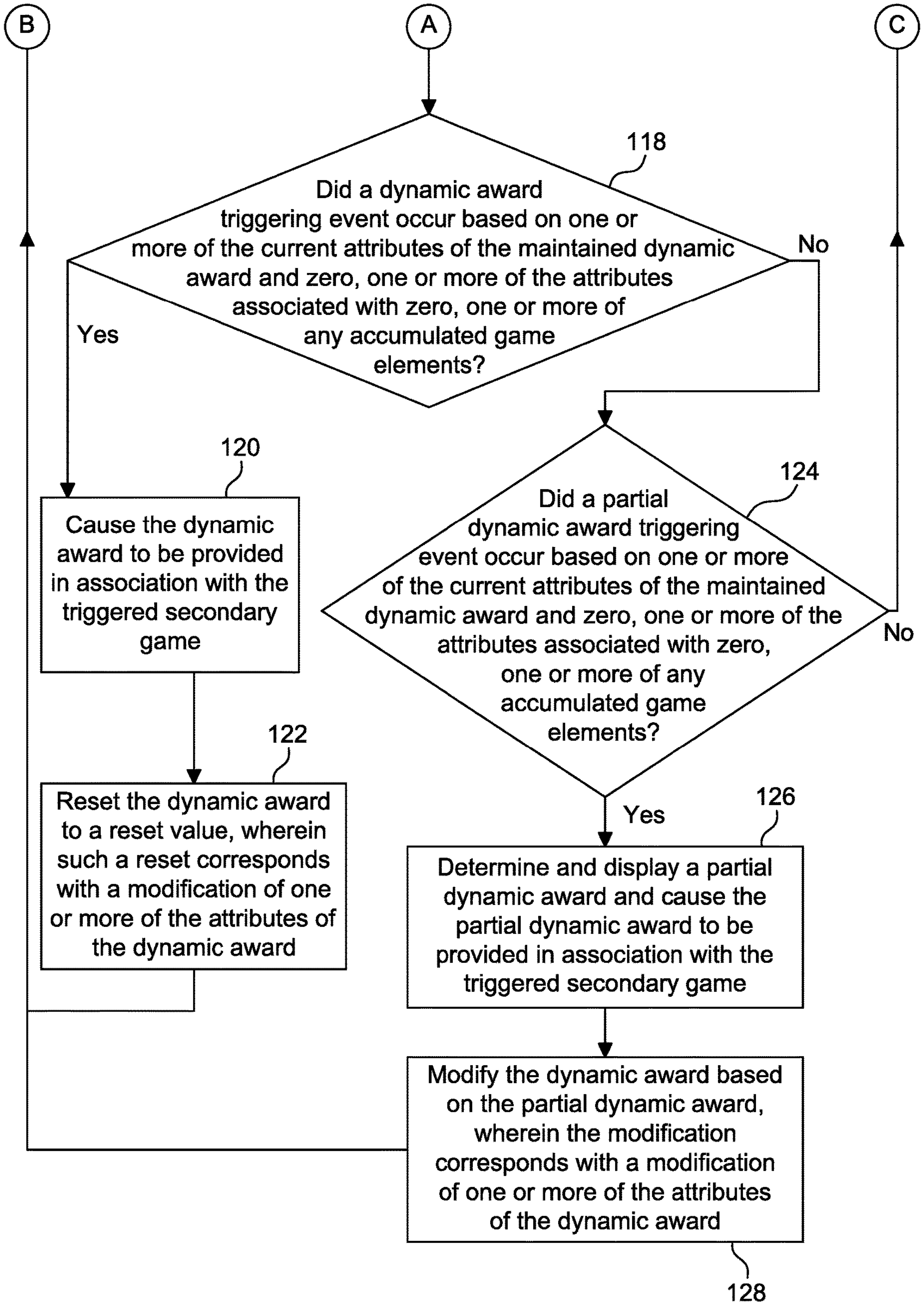

FIG. 1 is a flowchart of an example process or method of operating the gaming system of the present disclosure. In various embodiments, the process is represented by a set of instructions stored in one or more memories and executed by one or more processors. Although the process is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

Figure 2A:
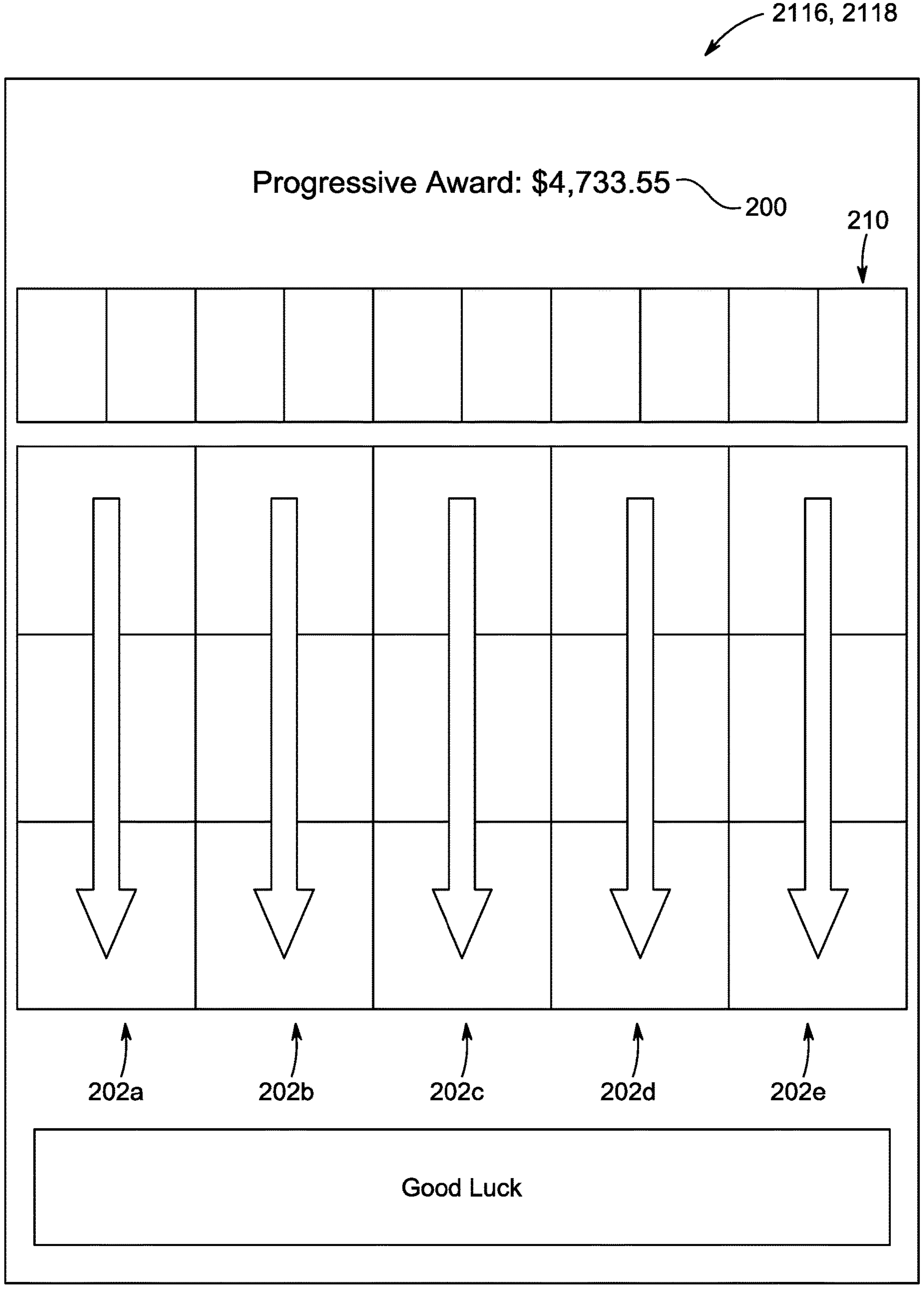
FIGS. 2A, 2B, 2C, 2D, 2E, and 2F are front views of one embodiment of the gaming system of the present disclosure illustrating an accumulation of game elements associated with attributes that collectively may match certain of the attributes of a dynamic award to determine a partial dynamic award and then modifies the dynamic award based on the partial dynamic award.

In various embodiments, the gaming system maintains a dynamic award as indicated in block 102. In these embodiments, the dynamic award is associated with one or more attributes. For example, as seen in FIG. 2A, the gaming system maintains a multi-digit value progressive award 200 in which the value of each individual or single digit of the progressive award is an attribute of that progressive award. In this example, since the progressive award 200 is currently valued at $4,733.55, the progressive award is currently associated with the individual attributes of the values of four (i.e., the thousands digit of the current value of the progressive award), seven (i.e., the hundreds digit of the current value of the progressive award), three (i.e., the tens digit of the current value of the progressive award), three (i.e., the ones digit of the current value of the progressive award), five (i.e., the tenths digit of the current value of the progressive award) and five (i.e., the hundredths digit of the current value of the progressive award). It should be appreciated that while illustrated as each individual digit of the progressive award being an individual attribute of that progressive award, in different embodiments, the values formed from groups or sets of two or more digits of the progressive award may qualify as the individual attributes of that progressive award. Similarly, while the attribute of each game element is illustrated as a single digit value, in different embodiments, multi-digit values may qualify as the attribute of a game element.

In certain embodiments, the gaming system maintains a plurality of different dynamic awards. In one such embodiment, the gaming system maintains a plurality of multi-digit value progressive awards (i.e., a plurality of dynamic awards) in a multi-level progressive award configuration ("MLP") associated with a single EGM. In certain embodiments, the progressive awards are maintained in an MLP configuration associated with a plurality of EGMs. In different embodiments wherein the progressive awards are associated with a plurality of EGMs, the EGMs may be in the same bank of EGMs or in the same gaming establishment (such that the progressive award may be considered a local area progressive ("LAP")) or in (or otherwise associated with) two or more different gaming establishments (such that the progressive award may be considered a wide area progressive ("WAP")).

In certain embodiments, as indicated in block 104 of FIG. 1, upon an occurrence of a dynamic award modification event, the gaming system modifies the maintained dynamic award, wherein such a modification corresponds with the modification of one or more of the attributes of that maintained dynamic award. In other words, as the dynamic award changes over time and responsive to certain events, the attributes associated with that dynamic award also changes over time and responsive to such events. In certain embodiments in which the dynamic award is a progressive award, upon an occurrence of a progressive award increment event, the gaming system increases one or more of the maintained progressive awards. In these embodiments, the increase to the value of a progressive award causes a modification of one or more attributes of the progressive award. That is, if each value of each individual digit of a progressive award qualifies as an attribute of that progressive award, the modification, such as an increase, of one or more values of one or more individual digits of the progressive award results in a modification of one or more of the attributes of that progressive award. Continuing with the above example, if, upon an occurrence of a progressive award increment event, the gaming system increases the maintained progressive award from $4,733.55 to $4,733.56, such an increase results in modifying the attribute associated with the hundredths digit of the current value of the progressive award from a value of five to a value of six.

In certain embodiments, the progressive award increment event occurs based on (or as a result of) a wager being placed on a play of a game associated with that progressive award. In this embodiment, the increase of the maintained progressive award is funded by a portion of the wager placed (e.g., 2% of the amount of wager placed is allocated to growing the progressive award). In certain embodiments, the progressive award increment event additionally or alternatively occurs based on (or as a result of) a side wager being placed in association with that progressive award. In this embodiment, the increase of the maintained progressive award is funded by part or all of the side wager placed (e.g., 50% of the amount of side wager placed is allocated to growing the progressive award). In certain embodiments, each of the progressive awards maintained by the gaming system have the same contribution rate (i.e., the portion of the wager placed allocated to the progressive award) and/or the same progressive award reset value. In certain embodiments, a plurality of the progressive awards maintained by the gaming system have different contribution rates and/or different progressive award reset values. In another such embodiment, the progressive award increment event additionally or alternatively occurs based on (or as a result of) one or more displayed events occurring in association with one or more plays of one or more games. In another such embodiment, the progressive award increment event occurs independent of any displayed events associated with any plays of any games.

In addition to maintaining and periodically increasing the value of the dynamic award, upon an occurrence of a game triggering event, the gaming system triggers a play of a game as indicated in block 106. In certain embodiments wherein the game is provided as a primary game, the game triggering event occurs upon a placement of a wager. In certain embodiments wherein the game is provided as a bonus game, the game triggering event occurs based on a displayed event associated with a play of a primary game. In another embodiment wherein the game is provided as a bonus game, the game triggering event occurs based on an event independent of any displayed event associated with the play of the primary game.

Figure 2B:
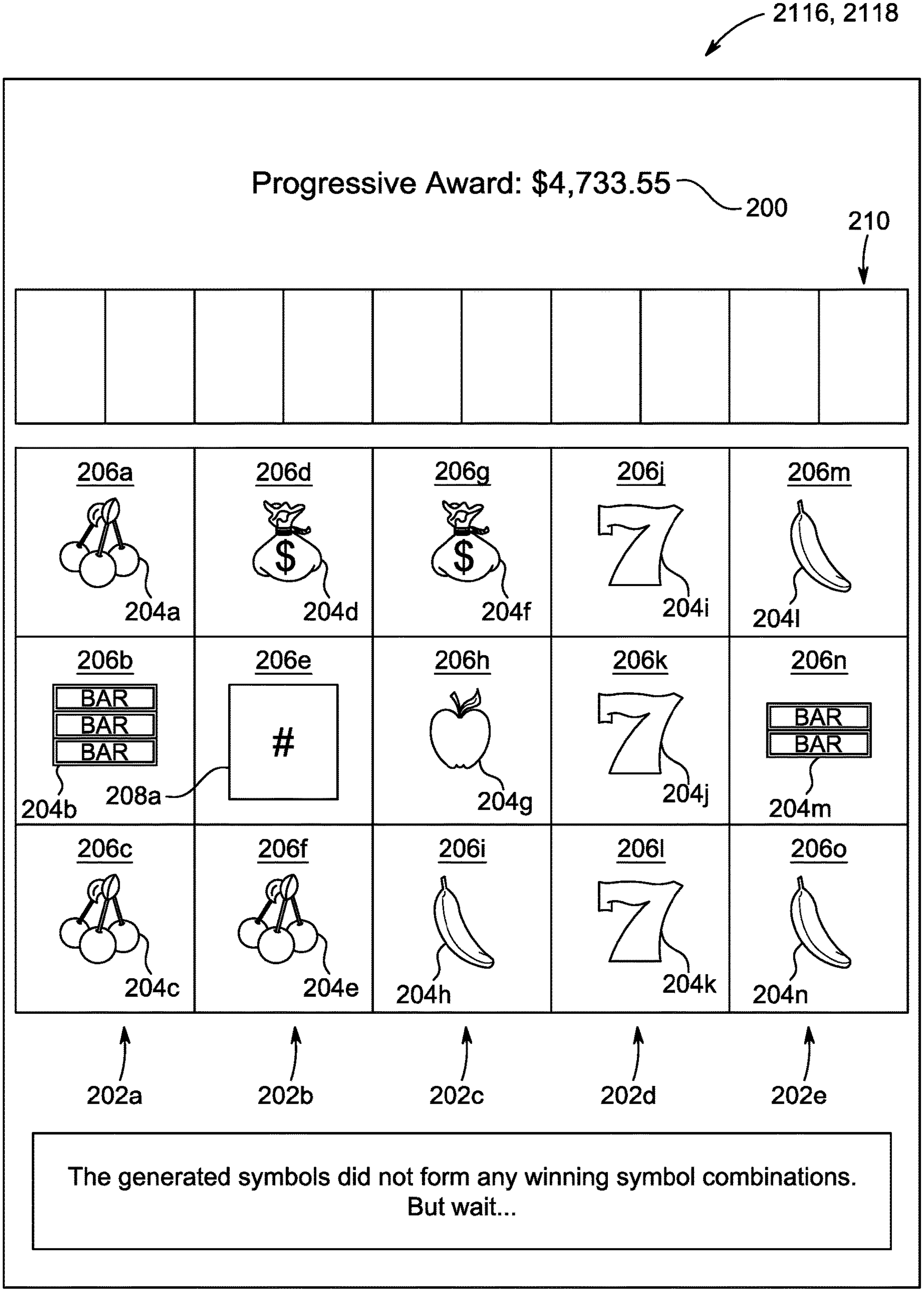

For the triggered play of the game, the gaming system determines and displays a game outcome as indicated in block 108 of FIG. 1. For example, for an initiated play of a primary reel game, the gaming system spins a plurality of reels 202*a* to 202*e* (as seen in FIG. 2A) to display a plurality of symbols 204*a* to 204*n* at a plurality of symbol display positions 206*a* to 206*o* associated with the plurality of reels 202*a* to 202*e* (as seen in FIG. 2B). For the triggered play of the game, the gaming system additionally determines and displays any award associated with the determined game outcome as indicated in block 110 of FIG. 1. For example, as seen in FIG. 2B, for the play of the primary reel game, the gaming system determined and display an award of zero based on the lack of any formed winning symbol combinations.

In addition to the determination and display of a game outcome and any associated award for the triggered play of the game, the gaming system determines if a game element accumulation event occurred in association with the play of the game as indicated in diamond 112. In certain embodiments, the game element accumulation event occurs based on an event independent of any displayed event associated with the play of the game. In certain embodiments, the game element accumulation event occurs based on a displayed event associated with the play of the game. For example, as seen in FIG. 2B, the game element accumulation event occurred based on the determination and display of a number sign symbol 208*a* (i.e., a game element) at symbol display position 206*e* for the play of the game. In certain embodiments, the gaming system evaluates a displayed game element symbol as a designated symbol, such as a wild symbol or a modifier symbol, in determining if any winning symbol combinations are formed including the displayed game element symbol. In certain embodiments, the gaming system evaluates a displayed game element symbol as a blocker symbol which is not part of any winning symbol combinations.

If the gaming system determines that a game element accumulation event occurred in association with the play of the game, the gaming system accumulates one or more game elements as indicated in block 114 of FIG. 1. In certain embodiments, when accumulated, each game element is associated with one or more attributes from a plurality of different attributes. For example, each game element is associated with a static value (i.e., an attribute) that may or may not be used to match to one or more value components (i.e., attributes) of the maintained dynamic award.

In certain embodiments, the gaming system accumulates each of the game elements displayed in association with the play of the game. In certain embodiments, the gaming system accumulates certain of, but not all of, the game elements displayed in association with the play of the game.

Figure 2C:
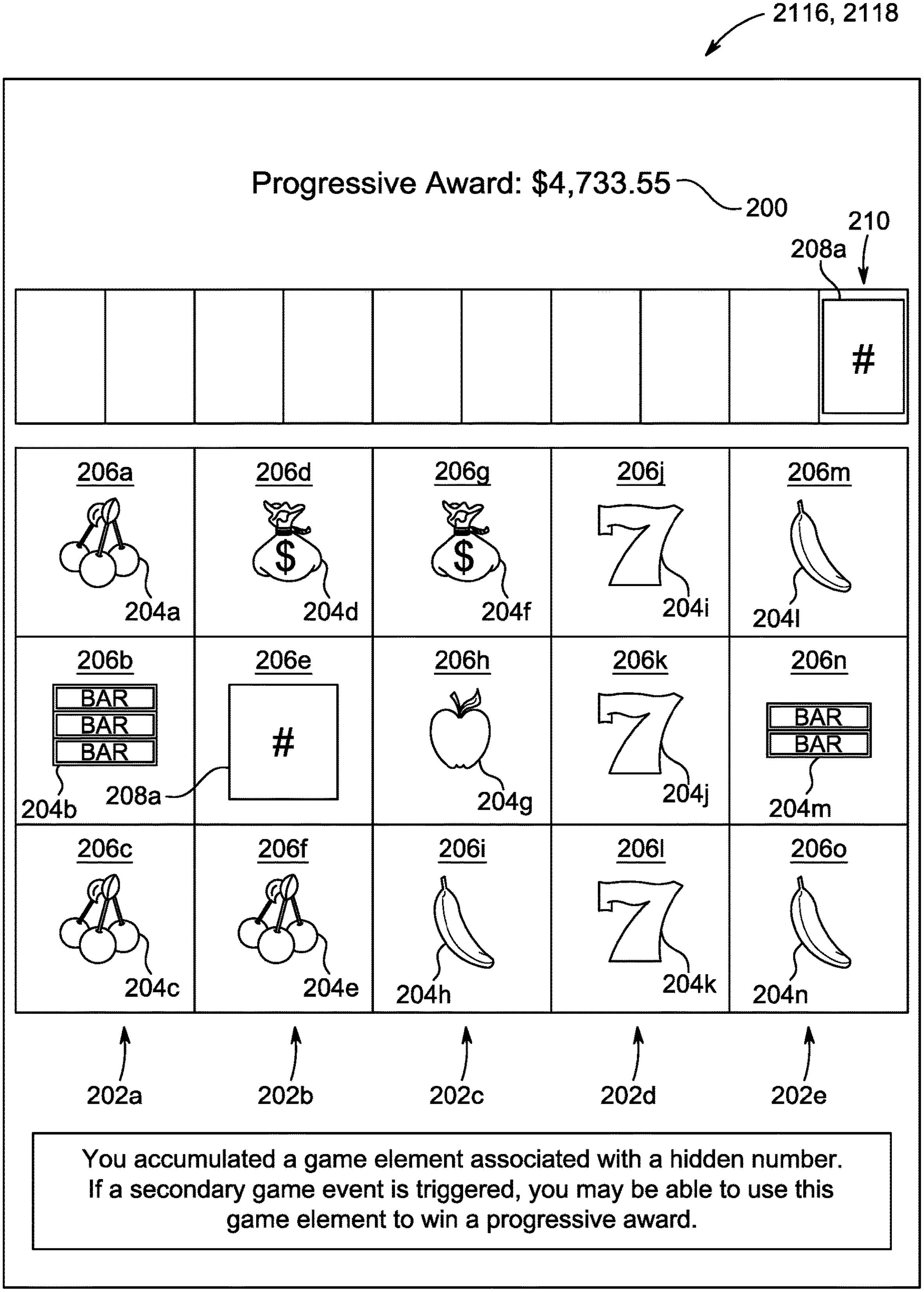

In certain embodiments, the gaming system accumulates the game element in association with a game element display position matrix including one or more game element display positions which are initially empty until game elements from the play of the triggered game are replicated therein. For example, as seen in FIG. 2C, following the game element accumulation event occurring in association with number sign symbol 208*a* (i.e., a game element) displayed at symbol display position 206*e*, the gaming system accumulates that displayed number sign symbol and displays that accumulated number sign symbol in association with a number sign symbol display position of number sign symbol display matrix 210. In certain such embodiments, as more game elements are accumulated, the gaming system adds more displayed game element display positions to the game element matrix such that the accumulated game elements are displayed as a growing stack or chain of accumulations. In another embodiment, the gaming system utilizes a plurality of game elements matrices which are concurrently, overlappingly or sequentially populated with replicated game elements. In one such embodiment, the gaming system sequentially fills these game matrices.

In certain embodiments, the gaming system accumulates the game element in association with a game element meter or counter that tracks quantities of accumulated game elements. In one such embodiment, the gaming system displays a non-numerical indication of the maintained game element meter such that the user is generally aware of a total quantity of game elements currently accumulated without being aware of a specific total quantity of game elements currently accumulated. In another such embodiment, the gaming system displays an indication of the maintained game element meter without displaying an indication of any threshold quantity of game elements for that meter (which would trigger a secondary game and/or a game element redemption) such that the user is aware of a total quantity of game elements currently accumulated without being aware of that total relative to a threshold quantity of game elements.

In certain embodiments, a game element accumulation event occurs in association with a determined outcome of the play of the game qualifying as a designated outcome, such as a winning outcome. In one such embodiment, different determined outcomes are associated with different quantities of accumulated game elements. For example, a winning outcome including four game elements is associated with an accumulation of four instances of that game element while a winning outcome including three game elements is associated with an accumulation of three instances of that game element. Such a configuration of different game outcomes being associated with different quantities of accumulated game elements provides that the randomness of which game outcomes are determined during a first period of time factors into the probability of one or more redemptions occurring to provide a dynamic award during a second, subsequent period of time. In another such embodiment, different determined outcomes are associated with the same quantity of accumulated game elements. For example, if a symbol combination includes a game element, the gaming system accumulates a static quantity of game elements regardless of the quantity of instances of game elements in the formed symbol combination. Such a configuration of different game outcomes being associated with the same quantity of accumulated game elements provides that the randomness of when certain game outcomes are determined (and when certain other game outcomes are not determined) during a first period of time factors into the probability of one or more redemptions occurring to provide a dynamic award during a second, subsequent period of time.

In certain embodiments, a game element accumulation event occurs and a quantity of game elements are accumulated in association with a combination of outcomes of the play of the game. For example, one winning symbol combination including one or more game elements displayed along one payline of a play of a reel game is not associated with an occurrence of a game element accumulation event, but two or more winning symbol combinations each including one or more game elements along two or more paylines of a play of a reel game (or over two plays of the reel game) is associated with an occurrence of a game element accumulation event and an accumulation of a quantity of game elements. In certain such embodiments, different combinations of outcomes are associated with different quantities of accumulated game elements. In other such embodiments, different combinations of outcomes are associated with the same quantity of accumulated game elements.

In certain embodiments, multiple game element accumulation events may occur in association with a single play of a game. In these embodiments, different game element accumulation events occur based on the occurrence (or lack thereof) of different game elements being displayed during a play of a game wherein such different game element accumulation events each result in the accumulation of one or more game elements. For example, if game element accumulation events occur in association with the symbols displayed at symbol display positions along different paylines, the gaming system accumulates the game elements associated with each occurrence of the game element accumulation event. In certain embodiments, each play of the game is limited to a single occurrence of a game element accumulation event.

In certain embodiments, the quantity of game elements accumulated is based on the game element accumulation event that occurred. In these embodiments, different game element accumulation events are associated with different quantities of game elements wherein which game element accumulation event that occurs determines the quantity of accumulated game elements. In certain embodiments, the quantity of accumulated game elements is based on a displayed event associated with the play of the game. In another embodiment, the quantity of game elements accumulated is based on an event independent of any displayed event associated with the play of the game.

In different embodiments, the gaming system utilizes different types or categories of game elements that may be accumulated responsive to an occurrence of a game element accumulation event. In certain such embodiments, different game elements are associated with different progressive awards and an accumulated game element may only be redeemed for its associated progressive award. For example, a game element associated with a first progressive award may be redeemed in association with that first progressive award but may not be redeemed in association with a second progressive award. In certain such embodiments, different game elements are associated with different digits of one or more progressive award and an accumulated game element may only be redeemed in association with a respective digit of that progressive award. For example, a game element associated with the tens digit may be redeemed in association with the tens digit of one or more progressive awards but may not be redeemed in association with a ones digit or a hundreds digit (or any other digit) of such progressive awards. In certain embodiments, these different types or categories of game elements are associated with different probabilities of being accumulated. For example, a first type of game element has a first probability of being displayed in association with a play of a game (and subsequently accumulated based on such display) and a second type of game element has a second, different probability of being displayed in association with a play of a game (and subsequently accumulated based on such display).

In certain embodiments in which the gaming system utilizes different types or categories of game elements that may be accumulated responsive to an occurrence of a game element accumulation event, the gaming system enables the trading of accumulated game elements between these different types. In certain such embodiments, the gaming system employs a suitable exchange rate for different types game elements. For example, following the gaming system accumulating four game elements associated with (i.e., potentially usable to win) a first progressive award but not associated with a second, higher valued progressive award, the gaming system enables the user to trade these four accumulated game elements for two game elements associated with the second progressive award.

In certain embodiments, if the gaming system determines that the game element accumulation event occurred in association with two or more different types of game elements, for each of such game elements, the gaming system increments a meter associated with that particular game element. In certain other embodiments, the gaming system employs different types or categories of game elements wherein each type or category of game element is associated with a separate game element matrix.

Figure 2D:
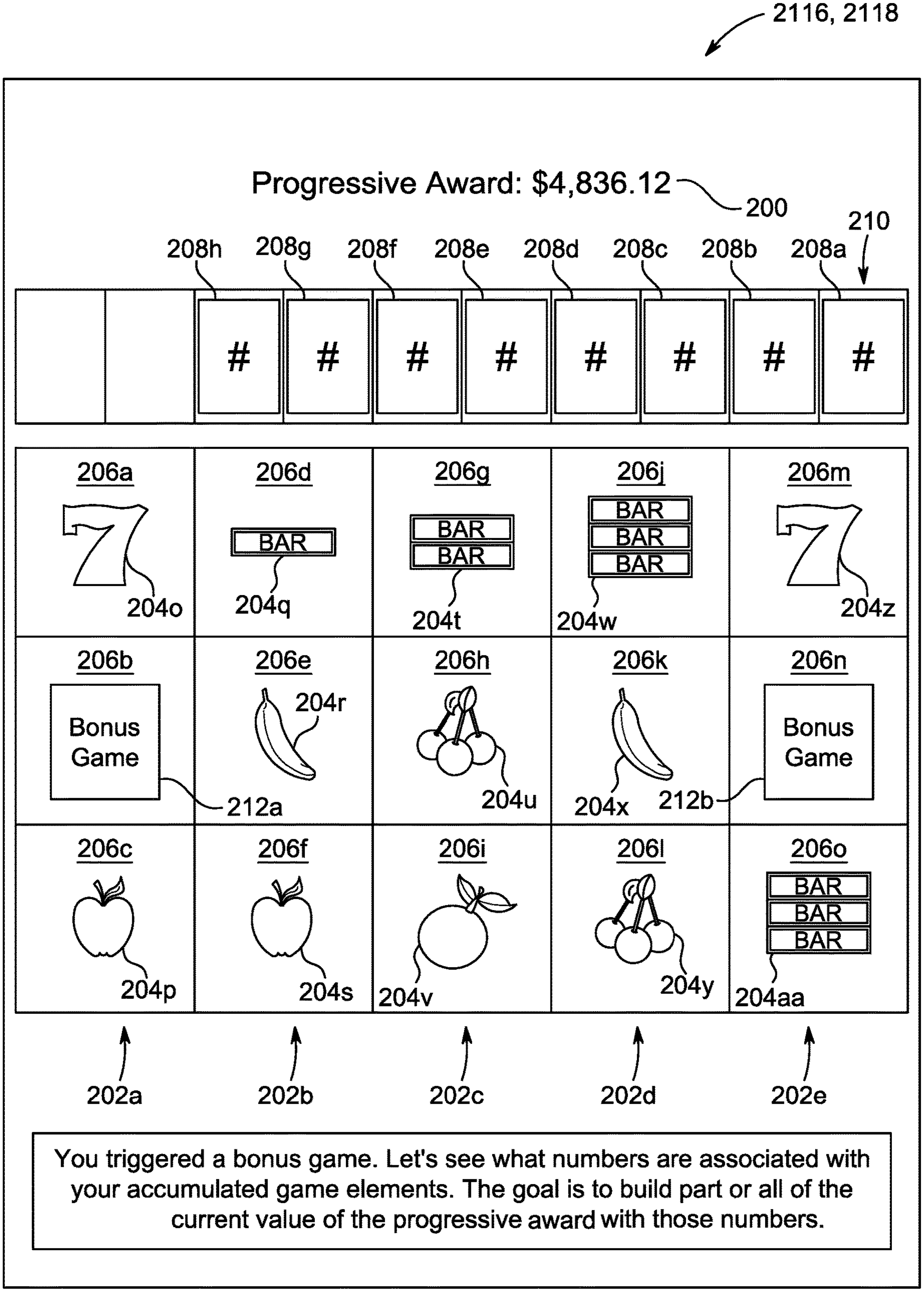

Following the accumulation of any game elements or upon a determination that no game element accumulation event occurred, the gaming system determines if a secondary game triggering event occurred as indicted by diamond 116 of FIG. 1. In certain embodiments, a secondary game triggering event occurs based on a displayed event associated with the play of the game. For example, as seen in FIG. 2D, following the accumulation of seven more game elements 208*b* to 208*h* over one or more subsequent plays of the game (not shown) and a series of increases of the progressive award 200 such that the progressive award is now valued at $4,836.12, the gaming system triggered the secondary game based on the generation of triggering symbols 212*a* and 212*b*. In certain embodiments, the secondary game triggering event occurs based on a quantity of accumulated game elements reaching a threshold quantity of game elements. In certain embodiments, the secondary game triggering event occurs based on an event independent of any displayed event associated with the play of the game. In certain embodiments, the secondary game triggering event occurs based on one or more inputs received, such as a user input to trigger a secondary game if a designated quantity of game elements have been accumulated.

If the gaming system determines that no secondary game triggering event occurred, the gaming system returns to block 102 and continues to maintain the dynamic award while awaiting a dynamic award modification event and another occurrence of a game triggering event. In these embodiments, despite the triggered play of the game not proceeding to a play of a secondary game, any game element accumulated in association with the play of the game are retained for another play of the game. In other words, any game element accumulated in association with one play of a game persists for at least another play of the game. Put differently, the lack of a secondary game triggering event has no effect of any previously accumulated game elements such that any game elements accumulated since the last redemption (or reset) of any accumulated game elements persist for another play of the game upon another occurrence of the game triggering event. In certain embodiments, the lack of a secondary game triggering event may effect zero, one or more previously accumulated game elements. In one such embodiment, any accumulated game elements persist for a period of time and/or quantity of subsequent plays of the game wherein if a secondary game triggering event does not occur within the period of time and/or quantity of subsequent plays of the game, such previously accumulated game elements expire.

In certain embodiments, similar to how the lack of a secondary game triggering event has no effect of any previously accumulated game elements, the lack of a game element accumulation event also has no effect of any previously accumulated game elements such that any game elements accumulated since the last redemption (or reset) of any accumulated game elements persist for another play of the game upon another occurrence of the game triggering event. In certain embodiments, the lack of a game element accumulation event may effect zero, one or more previously accumulated game elements. In one such embodiment, any accumulated game elements persist for a period of time and/or quantity of subsequent plays of the game wherein if a game element accumulation event does not occur within the period of time and/or quantity of subsequent plays of the game, such previously accumulated game elements expire.

If the gaming system determines that a secondary game triggering event occurred, for a triggered secondary game, the gaming system determines, as indicated in block 118, if a dynamic award triggering event occurred. In such embodiments, the determination of whether or not a dynamic award triggering event occurs is based on one or more of the current attributes of the maintained dynamic award and zero, one or more of the attributes associated with zero, one or more of any accumulated game elements.

In certain embodiments, the determination of if the dynamic award triggering event occurred includes determining whether to enable, in exchange for the dynamic award, the redemption of one or more of any accumulated game elements associated with attributes that collectively match each of the current attributes of the dynamic award. In these embodiments, if the collective attributes of the accumulated game elements (or a subset of the accumulated game elements) match or otherwise correspond with each of the current attributes of the dynamic award, the gaming system enables such a redemption of the applicable game elements and determines that the dynamic award triggering event occurred.

Figure 2E:
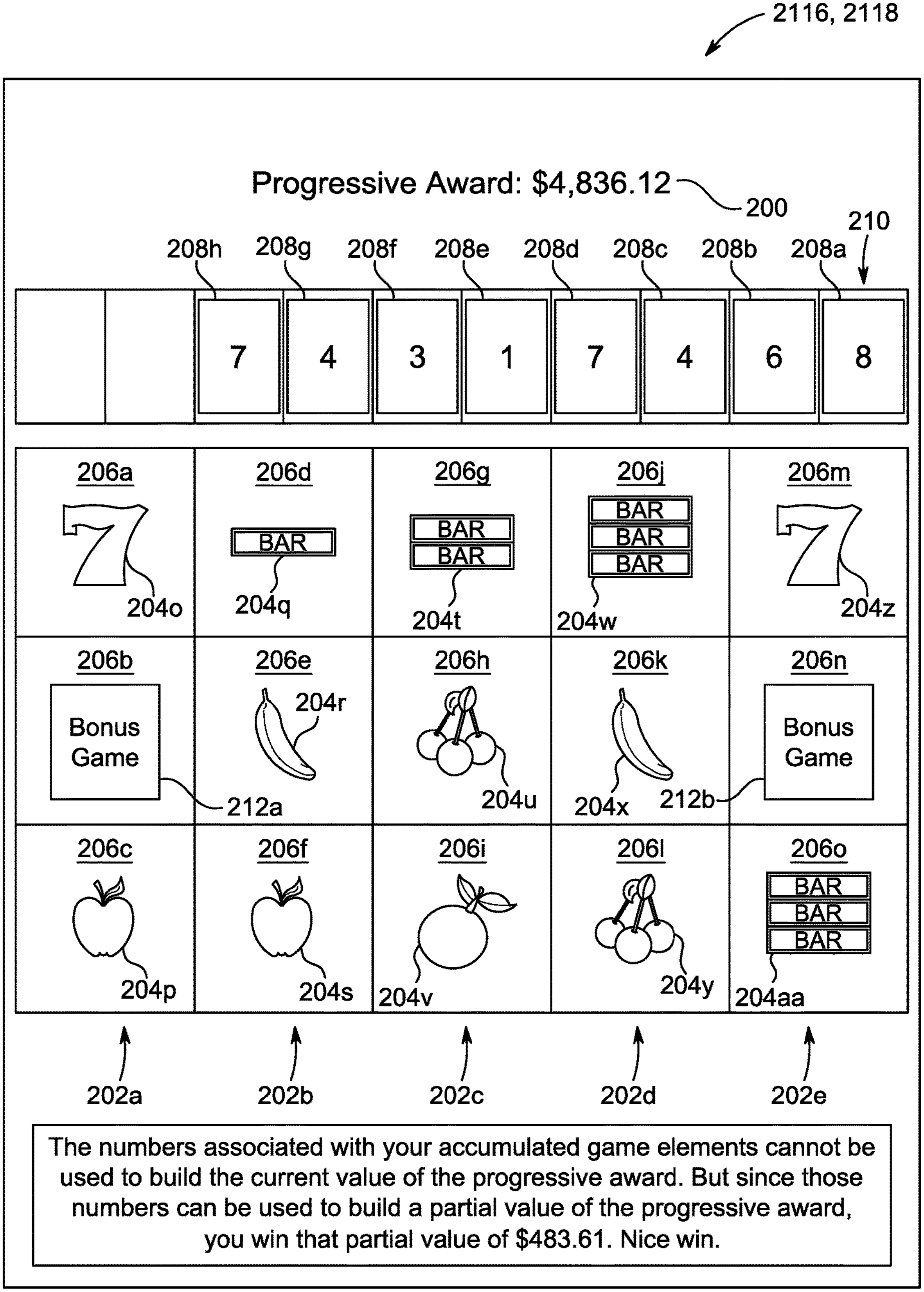

For example, following the gaming system displaying the value attributes associated with each of the accumulated game elements 208*a* to 208*h* (as seen in FIG. 2D), the gaming system determines that since each of the values of each of the digits of the current value of the progressive award cannot be accounted for with a value associated with an accumulated game element, no progressive award triggering event occurs and no accumulated game elements may be redeemed in exchange for the entire progressive award (as seen in FIG. 2E). Specifically, in this example, the gaming system determines that the progressive award triggering event did not occur based on: (i) the progressive award being currently associated with the individual attributes of the values of four (i.e., the thousands digit of the current value of the progressive award), eight (i.e., the hundreds digit of the current value of the progressive award), three (i.e., the tens digit of the current value of the progressive award), six (i.e., the ones digit of the current value of the progressive award), one (i.e., the tenths digit of the current value of the progressive award) and two (i.e., the hundredths digit of the current value of the progressive award), and (ii) the values of four, eight, three, six, one and two being unable to be matched to the attributes of the eight accumulated game elements.

If the gaming system determines that, based on one or more of the current attributes of the maintained dynamic award and zero, one or more of the attributes associated with zero, one or more of any accumulated game elements, the dynamic award triggering event occurred, the gaming system causes the dynamic award to be provided in association with the triggered secondary game and resets the dynamic award to a reset value as indicated in blocks 120 and 122 of FIG. 1. In such instances, resetting the dynamic award to a reset value includes modifying one or more of the attributes associated with the dynamic award. That is, since the attributes of the dynamic award include the individual values of the individual digits that collectively form the dynamic award, resetting the value of the dynamic award to a reset value includes changing one or more of the individual values of such individual digits. Following the resetting of the dynamic award, the gaming system returns to block 102 and maintains the (now reset) dynamic award while awaiting a dynamic award modification event and another occurrence of a game triggering event.

In certain embodiments, in utilizing one or more accumulated game elements associated with attributes that match attributes of the dynamic award to cause the dynamic award triggering event, the gaming system redeems or otherwise ceases to retain such previously accumulated game elements with matching attributes. In certain embodiments, in utilizing one or more accumulated game elements associated with attributes that match attributes of the dynamic award to cause the dynamic award triggering event, the gaming system redeems or otherwise ceases to retain each accumulated game element including game elements with matching and non-matching attributes. In certain embodiments, in utilizing one or more accumulated game elements associated with attributes that match attributes of the dynamic award to cause the dynamic award triggering event, the gaming system retains one, or more or each of the accumulated game elements for another occurrence of the secondary game triggering event.

If the gaming system determines that, based one or more of the current attributes of the maintained dynamic award and one or more of the attributes associated with one or more of any accumulated game elements, the dynamic award triggering event did not occur in association with the triggered secondary game, the gaming system determines, as indicated in block 124, if a partial dynamic award triggering event occurs. In such embodiments, the determination of whether or not a partial dynamic award triggering event occurs is based on one or more of the current attributes of the maintained dynamic award and zero, one or more of the attributes associated with zero, one or more of any accumulated game elements. If the gaming system determines that, based on one or more of the current attributes of the maintained dynamic award and one or more of the attributes associated with one or more of any accumulated game elements, the partial dynamic award triggering event occurred, the gaming system determines and displays a partial dynamic award to be provided in association with the triggered secondary game as indicated in block 126 of FIG. 1.

In certain embodiments, the determination of if the partial dynamic award triggering event occurred includes determining whether to enable, in exchange for a portion of the dynamic award, the redemption of one or more of any accumulated game elements associated with attributes that match one or more current attributes of the dynamic award. In these embodiments, if the collective attributes of the accumulated game elements (or a subset of the accumulated game elements) match or otherwise correspond with some, but not all, of the current attributes of the dynamic award, the gaming system enables such a redemption of the applicable game elements and determines that the partial dynamic award triggering event occurred.

For example, following the gaming system displaying the value attributes associated with each of the accumulated game elements 208*a* to 208*h* (as seen in FIG. 2D), the gaming system determines that since certain of the values of certain of the digits of the current value of the progressive award can be accounted for with a value associated with an accumulated game element, the partial progressive award triggering event occurs and certain of the accumulated game elements may be redeemed in exchange for a part of the progressive award (as seen in FIG. 2E). In this example, even if each of the values of each of the digits of the current value of the progressive award cannot be accounted for with a value associated with an accumulated game element, since a subset of the values of a subset of the digits of the current value of the progressive award can be accounted for with a value associated with an accumulated game element, the partial progressive award triggering event occurs. Specifically, in this example, the gaming system determines that the partial progressive award triggering event occurred based on: (i) the progressive award being currently associated with the individual attributes of the values of four (i.e., the thousands digit of the current value of the progressive award), eight (i.e., the hundreds digit of the current value of the progressive award), three (i.e., the tens digit of the current value of the progressive award), six (i.e., the ones digit of the current value of the progressive award), one (i.e., the tenths digit of the current value of the progressive award) and two (i.e., the hundredths digit of the current value of the progressive award), and (ii) the values of four, eight, three, six, and one being matched to accumulated game elements 208*g*, 208*a*, 208*f*, 208*b*, and 208*e*, respectively. In this example, based on such matching attributes between part of the progressive award and certain of the accumulated game elements, the gaming system determines a partial progressive award of $483.61 to be provided in association with the triggered secondary game.

Figure 2F:
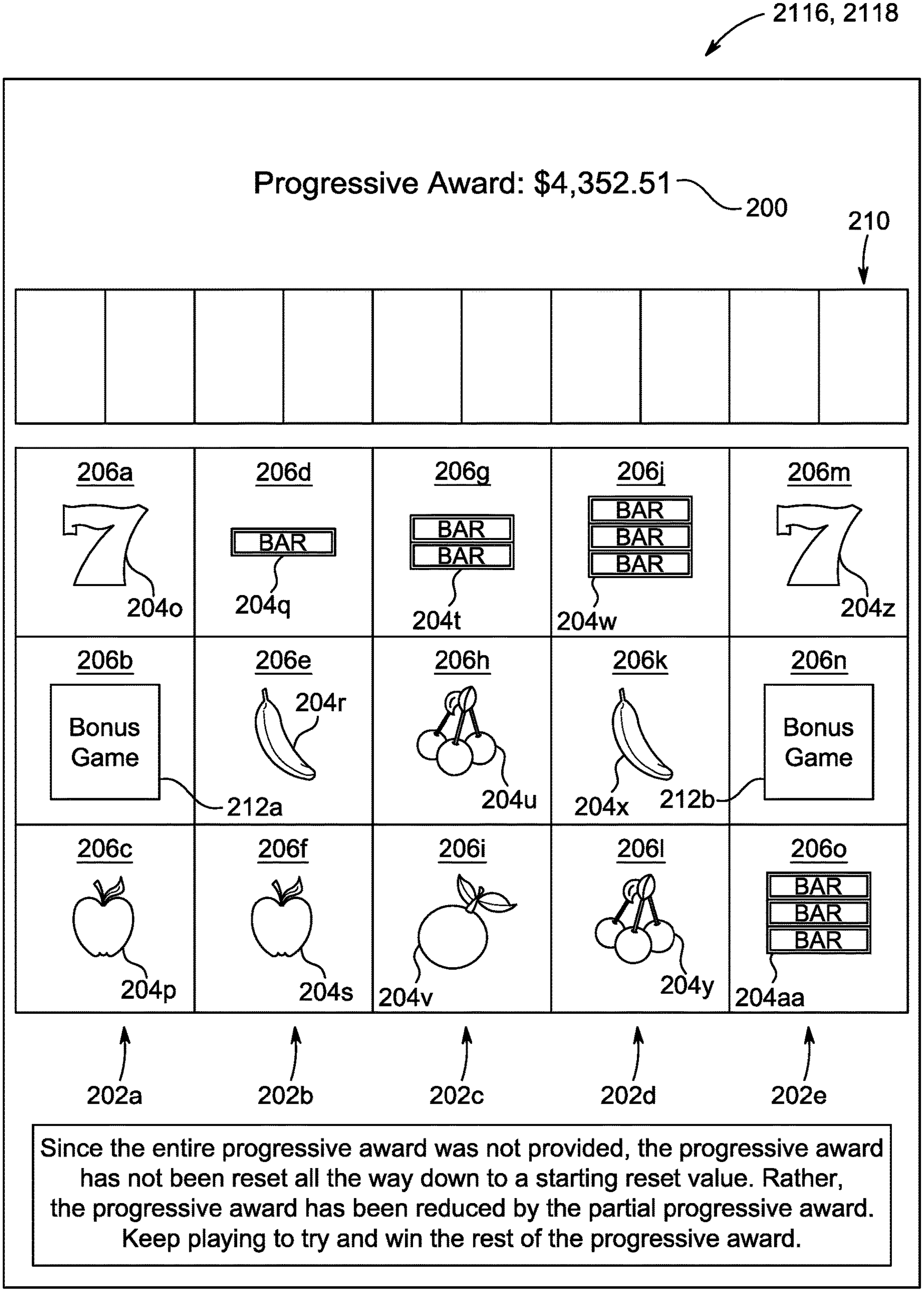

Following such a determination of a partial dynamic award, the gaming system modifies the dynamic award based on the partial dynamic award as indicated in block 128 of FIG. 1. That is, the gaming system utilizes the partial dynamic award to partially reset the dynamic award to a different value. For example, following a determination of a partial progressive award of $483.61, the gaming system reduces the progressive award of $4,836.12 (as seen in FIG. 2E) by the partial progressive award of $483.61 to result in a modified progressive award of $4,352.51 (as seen in FIG. 2F). It should be appreciated that modifying the dynamic award based on the partial dynamic award includes modifying one or more of the attributes associated with the dynamic award. In these instances, since the attributes of the dynamic award include the individual values of the individual digits that collectively form the dynamic award, changing the value of the dynamic award to account for the partial dynamic award includes changing one or more of the individual values of such individual digits.

In certain embodiments, the gaming system not resetting the current value of the dynamic award to a predetermined reset value associated with the dynamic award qualifies as the gaming system skipping any resetting of the current value of the dynamic award. In certain other embodiments, the gaming system not resetting of the current value of the dynamic award to the predetermined reset value associated with the dynamic award qualifies as the gaming system dynamically determining a reset value after the occurrence of the partial dynamic award triggering event wherein the determined reset value equals the current value of the dynamic award minutes the determined value of the partial dynamic award.

In certain embodiments, the gaming system imposes no limits on the quantity of times the dynamic award may be modified with the partial dynamic award during a period of time without otherwise resetting to a predetermined reset value. In certain embodiments, the gaming system imposes no limits on the quantity of consecutive times the dynamic award may be modified with the partial dynamic award without otherwise resetting to a predetermined reset value. In certain embodiments, the gaming system employs a maximum quantity of times the dynamic award may be modified with the partial dynamic award during a period of time without otherwise resetting to a predetermined reset value. In certain embodiments, the gaming system employs a maximum quantity of consecutive times the dynamic award may be modified with the partial dynamic award without otherwise resetting to a predetermined reset value. In certain embodiments, the gaming system employs a minimum quantity of times the dynamic award may be modified with the partial dynamic award during a period of time without otherwise resetting to a predetermined reset value. In certain embodiments, the gaming system employs a minimum quantity of consecutive times the dynamic award may be modified with the partial dynamic award without otherwise resetting to a predetermined reset value.

It should be appreciated that while the long-term average expected payback percentage of the gaming system of the present disclosure remains relatively unchanged by the periodic determinations to modify the dynamic award with the partial dynamic award after a partial dynamic award triggering event, the short-term average expected payback percentage of the gaming system may fluctuate based on when such determinations occur and the frequency which such determinations occur. As such, if a plurality of consecutive determinations to modify the dynamic award with the partial dynamic award occur during a period of time, the dynamic award will continue to grow to relatively higher and higher values during that period of time resulting in a greater total payout in the form of dynamic awards during the period of time (which results in a higher average expected payback percentage during the period of time).

Following the modification of the dynamic award based on the partial dynamic award, the gaming system returns to block 102 and maintains the (now modified) dynamic award while awaiting a dynamic award modification event and another occurrence of a game triggering event.

In certain embodiments, in utilizing one or more accumulated game elements associated with attributes that match attributes of the dynamic award to cause the partial dynamic award triggering event, the gaming system redeems or otherwise ceases to retain such previously accumulated game elements with matching attributes. In certain embodiments, in utilizing one or more accumulated game elements associated with attributes that match attributes of the dynamic award to cause the partial dynamic award triggering event, the gaming system redeems or otherwise ceases to retain each accumulated game element including game elements with matching and non-matching attributes. For example, as seen in FIG. 2F, following the partial dynamic award triggering event, the gaming system removes each of the previously accumulated game elements. In certain embodiments, in utilizing one or more accumulated game elements associated with attributes that match certain of the attributes of the dynamic award to cause the partial dynamic award triggering event, the gaming system retains one, or more or each of the accumulated game elements for another occurrence of the secondary game triggering event.

If the gaming system determines that, based one or more of the current attributes of the maintained dynamic award and zero, one or more of the attributes associated with zero, one or more of any accumulated game elements, the partial dynamic award triggering event did not occur in association with the triggered secondary game, the gaming system returns to block 102 and continues to maintain the dynamic award while awaiting a dynamic award modification event and another occurrence of a game triggering event. For example, if the gaming system determines that none of the values of any of the digits of the current value of the progressive award can be accounted for with any values associated with any accumulated game elements, the gaming system does not redeem such accumulated game elements in exchange for even part of the progressive award and rather awaits for another opportunity to match attributes of accumulated game elements to attributes of the digits of the progressive award.

In certain embodiments, if the play of the secondary game results in no occurrence of the dynamic award triggering event (or the partial dynamic award triggering event), the gaming system retains any accumulated game element for another play of the game. In other words, any game element accumulated in association with one play of a game persists for at least another play of the game despite the triggering of the secondary event without an occurrence of the dynamic award triggering event (and/or the partial dynamic award triggering event). Put differently, the lack of the dynamic award triggering event (and/or the lack of a partial dynamic award triggering event) has no effect of any previously accumulated game elements such that any game elements accumulated since the last redemption (or reset) of any accumulated game elements persist for another play of the game upon another occurrence of the game triggering event.

In certain embodiments, the lack of a dynamic award triggering event (and/or a partial dynamic award triggering event) may effect zero, one or more previously accumulated game elements. In these embodiments, the occurrence of a secondary game triggering event without a dynamic award triggering event (or a partial dynamic award triggering event) has the effect of removing or otherwise resetting any previously accumulated game elements such that any game elements accumulated since the last occurrence of the secondary game triggering event cease to persist for another play of the game upon another occurrence of the game triggering event. In certain embodiments, the occurrence of a secondary game triggering event without a dynamic award triggering event (or a partial dynamic award triggering event) has the effect of removing or otherwise resetting certain of the previously accumulated game elements such that some, but not all, of the game elements accumulated since the last occurrence of the secondary game triggering event cease to persist for another play of the game upon another occurrence of the game triggering event. In another such embodiment, any accumulated game elements persist for a period of time and/or quantity of subsequent plays of the game wherein if a dynamic award triggering event (and/or the partial dynamic award triggering event) does not occur within the period of time and/or quantity of subsequent plays of the game, such previously accumulated game elements expire.

In different embodiments in which one or more accumulated game elements are removed or otherwise expire without being utilized to match a corresponding attribute of a maintained dynamic award, the gaming system offers an award opportunity, such as a free spin, for that game element. In certain embodiments, the gaming system redeems such unused game elements for an award, such as a value. In certain embodiments, the gaming system redeems such unused game elements (relative to the current configuration of the dynamic award) for another game element associated with another attribute. In these embodiments, the gaming system employs a suitable exchange rate of unused game elements (relative to the current configuration of the dynamic award) to new game elements associated with new attributes.

In certain embodiments, if the gaming system determines that, based on one or more of the current attributes of the maintained dynamic award and zero, one or more of the attributes associated with zero, one or more of any accumulated game elements, the dynamic award triggering event (and/or the partial dynamic award triggering event) did not occur, the gaming system enables the user to exchange one or more unused accumulated game elements (i.e., a game element associated with attributes that do not match any of the attributes of the maintained dynamic award) for another game element that may or may not be associated with an attribute that matches any of the attributes of the maintained dynamic award. In certain such embodiments, the gaming system employs a suitable exchange rate of unused game elements (relative to the current configuration of the dynamic award) to new game elements associated with new attributes. For example, if a secondary game triggering event occurs and the gaming system determines that six accumulated game elements are each unusable for the current configuration of the dynamic award, the gaming system enables these six accumulated game elements to be traded in for three new game elements that may or may not be useable for the current configuration of the dynamic award.

In certain embodiments in which the gaming system maintains a plurality of dynamic awards, the gaming system enables the user to select which accumulated game elements to attempt to apply to which of the dynamic awards. In these embodiments, if an accumulated game element is associated with an attribute that matches an attribute of at least two of the dynamic awards, the gaming system enables the user to select which of the dynamic awards to redeem such a game element with. Such a configuration involves a degree of strategy as a user must assess each of the dynamic awards, such as the number of digits of that dynamic award, in determining how to allocate one or more accumulated game elements. In certain embodiments in which the gaming system maintains a plurality of dynamic awards, the gaming system automatically determines, such as based on an expected award associated with the different options available, which accumulated game elements to attempt to apply to which of the dynamic awards.

In certain embodiments in which a dynamic award modification event may occur during a triggered secondary game, the gaming system employs an automatic triggering of the secondary game (if the secondary game triggering event occurs) and/or a time limit on the play of the secondary. In these embodiments, the gaming system takes certain measures to prevent a user from delaying the play of the secondary game until the attributes of the dynamic award match the attributes of the accumulated game elements. For example, if the user has accumulated game elements associated with values that can form an award of $534 and the progressive award is currently valued at $512 when a secondary game triggering event occurs, the gaming system prevents the user from delaying the initiation of the secondary game (e.g., a user not pressing a start button to participate in the secondary game after an occurrence of the secondary game triggering event) and/or prolonging the play of the secondary game until the progressive award grows in value to $534.

In certain embodiments, the gaming system masks one or more attributes of one or more accumulated game elements. For example, as seen in FIGS. 2B to 2D, the gaming system accumulates number sign symbol 208*a* without revealing the value (i.e., the attribute) associated with that accumulated number sign symbol. In one such embodiment, if the gaming system enables an on-demand triggering of the secondary game (i.e., the user may trigger the secondary game whenever a quantity of one or more game elements have been accumulated), the masking of the attributes of the accumulated game elements prevents the user from waiting until the value of the dynamic award is a certain value that corresponds with the values of the accumulated game elements.

In certain embodiments, the gaming system reveals one or more attributes of one or more accumulated game elements. For example (not shown), with the accumulation of each number sign symbol, the gaming system reveals the static value (i.e., the attribute) associated with that accumulated number sign symbol. In one such embodiment, if the gaming system employs a randomly occurring event to trigger the secondary game, the displaying of the attributes of the accumulated game elements operates to build anticipation without otherwise providing a user an ability to wait until the value of the dynamic award is a certain value that corresponds with the values of the accumulated game elements. In certain embodiments, the gaming system reveals one or more attributes of certain accumulated game elements while masking or otherwise hiding one or more attributes of certain other accumulated game elements. In certain embodiments in which the gaming system enables a user to trigger the play of the secondary game on-demand and the gaming system reveals the attributes associated with each of the game elements upon accumulation of such game elements, following the redemption of one or more of the accumulated game elements (but not enough game elements to win the dynamic award), the gaming system resets the attributes associated with the remaining accumulated game elements.

In certain embodiments, one or more accumulated game elements qualify as a wild game element that may be used as any value of any digit of the maintained dynamic award. In certain embodiments, one or more accumulated game elements qualify as a wild game element that may be used as certain values, but not all values, of any digit of the maintained dynamic award. In certain embodiments, one or more accumulated game elements qualify as a wild game element that may be used as any value of certain digits, but not all digits, of the maintained dynamic award. In certain embodiments, one or more accumulated game elements qualify as a wild game element that may be used as certain values, but not all values, of certain digits, but not all digits, of the maintained dynamic award. In these embodiments, the attributes of the wild game element may change based on the current configuration of the dynamic award. In certain embodiments, one or more accumulated game elements qualify as terminator game elements that cause the removal of one or more (or each) of any accumulated game elements.

In certain embodiments, as illustrated in FIGS. 2A to 2F, the dynamic award includes a variable valued award. In other embodiments, the dynamic award includes a variable quantity of activations of one or more features and/or a changing magnitude of the activation of a feature of a game. In different embodiments, such features of the dynamic award includes, but is not limited to: a feature which modifies one or more game outcomes of one or more plays of a game (e.g., the symbols evaluated for the play(s) of the game); a feature which modifies the paytable utilized for an individual play of a game and/or over a series of plays of a secondary game; a feature which modifies any award determined for an individual play of a game and/or over a series of plays of a secondary game; a feature which superimposed one or more symbols over the randomly generated symbols of the reels; a feature which replaces one or more symbols of the randomly generated symbols of the reels with a predetermined symbol pattern; a feature which replaces one or more symbols of the randomly generated symbols of the reels with a predetermined pattern of wild symbols; a feature which provides an additional award amount to a player; a feature modifying an amount of credits of a credit balance; a feature modifying an amount of promotional credits; a feature modifying a rate of earning player tracking points; a feature modifying a triggering event of a play of a secondary or bonus game; a feature modifying an activation of a secondary or bonus display (such as an award generator); a feature modifying a quantity of activations of a secondary or bonus display (e.g., a feature modifying a quantity of spins of an award generator); a feature modifying a quantity of sections of a secondary or bonus display (e.g., a feature modifying a quantity of sections of an award generator); a feature modifying one or more awards of a secondary or bonus display; a feature modifying an activation of a community award generator; a feature modifying a quantity of activations of a community award generator; a feature modifying a quantity of sections of a community award generator; a feature modifying one or more awards of a community award generator; a feature modifying a generated outcome (or a designated generated outcome) in a secondary game; a feature modifying a placed wager amount; a feature modifying a placed side wager amount; a feature modifying a number of wagered on paylines; a feature modifying a wager placed on one or more paylines (or on one or more designated paylines); a feature modifying a number of ways to win wagered on; a feature modifying a wager placed on one or more ways to win (or on one or more designated ways to win); a feature modifying an average expected payback percentage for an individual play of a game and/or over a series of plays of a secondary game; a feature modifying an average expected payout for an individual play of a game and/or over a series of plays of a secondary game; a feature modifying one or more awards available; a feature modifying a range of awards available; a feature modifying a type of awards available; a feature modifying one or more progressive awards; a feature modifying which progressive awards are available to be won; a feature modifying an activation of a reel (or a designated reel); a feature modifying an activation of a plurality of reels; a feature modifying a generated outcome (or a designated generated outcome) on a designated payline; a feature modifying a generated outcome (or a designated generated outcome) in a scatter configuration; a feature modifying a winning way to win (or a designated winning way to win); a feature modifying a designated symbol or symbol combination; a feature modifying a generation of a designated symbol or symbol combination on a designated payline; a feature modifying a generation of a designated symbol or symbol combination in a scatter configuration; a feature modifying a quantity of picks in a selection game; a feature modifying a quantity of offers in an offer and acceptance game; a feature modifying a quantity of moves in a trail game; a feature modifying an amount of free spins provided; a feature modifying a game terminating or ending condition; a feature modifying how one or more aspects for an individual play of a game and/or over a series of plays of a secondary game (e.g., colors, speeds, sound) are displayed to a player; and/or a feature modifying any game play feature associated with any play of any game of the present disclosure.

In different embodiments, the awards available in association with one or more plays of any game of the present disclosure include, but are not limited to, one or more of: a progressive award, a quantity of monetary credits, a quantity of non-monetary credits, a quantity of promotional credits, a quantity of player tracking points, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more products or services, one or more bonus credits usable for online play, a lump sum of player tracking points or credits, a multiplier for player tracking points or credits, an increase in a membership or player tracking level, one or more coupons or promotions usable within and/or outside of the gaming establishment, virtual goods associated with the gaming system, virtual goods not associated with the gaming system, an access code usable to unlock content on an internet.

In one embodiment, the gaming system causes at least one display device of the gaming system to display the play of any game of the present disclosure. In another embodiment, the gaming system additionally or alternatively causes one or more community or overhead display devices to display part or all of the play of any game of the present disclosure to one or more other users or bystanders either at a gaming establishment or viewing over a network, such as the internet. In another embodiment, the gaming system additionally or alternatively causes one or more internet sites to each display part or all of the play of any game of the present disclosure such that a user is enabled to log on from a personal web browser.

In different embodiments, a dynamic award modification event, a game triggering event, a game element accumulation event, a secondary game triggering event, a dynamic award triggering event, and/or a partial dynamic award triggering event occurs based on an outcome associated with one or more plays of any primary games. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes such conditions to be satisfied and/or one or more of such events to occur.

In different embodiments, the gaming system does not provide any apparent reasons for an occurrence of a game triggering event, a game element accumulation event, a secondary game triggering event, and/or a game element redemption event. In these embodiments, such determinations are not triggered by an event in a primary game or based specifically on any of the plays of any primary games. That is, these events occur without any explanation or alternatively with simple explanations.

In one such embodiment, a dynamic award modification event, a game triggering event, a game element accumulation event, a secondary game triggering event, a dynamic award triggering event, and/or a partial dynamic award triggering event occurs based on an amount of coin-in. In this embodiment, the gaming system determines if an amount of coin-in reaches or exceeds a designated amount of coin-in (i.e., a threshold coin-in amount). Upon the amount of coin-in wagered reaching or exceeding the threshold coin-in amount, the gaming system causes one or more of such events or conditions to occur. In another such embodiment, a dynamic award modification event, a game triggering event, a game element accumulation event, a secondary game triggering event, a dynamic award triggering event, and/or a partial dynamic award triggering event occurs based on an amount of virtual currency-in. In this embodiment, the gaming system determines if an amount of virtual currency-in wagered reaches or exceeds a designated amount of virtual currency-in (i.e., a threshold virtual currency-in amount). Upon the amount of virtual currency-in wagered reaching or exceeding the threshold virtual currency-in amount, the gaming system causes one or more of such events or conditions to occur. In different embodiments, the threshold coin-in amount and/or the threshold virtual currency-in amount is predetermined, randomly determined, determined based on a user's status (such as determined through a player tracking system), determined based on a generated symbol or symbol combination, determined based on a random determination by the server, determined based on a random determination at the EGM, determined based on one or more side wagers placed, determined based on the primary game wager, determined based on time (such as the time of day) or determined based on any other suitable method or criteria.

In one such embodiment, a dynamic award modification event, a game triggering event, a game element accumulation event, a secondary game triggering event, a dynamic award triggering event, and/or a partial dynamic award triggering event occurs based on an amount of coin-out. In this embodiment, the gaming system determines if an amount of coin-out reaches or exceeds a designated amount of coin-out (i.e., a threshold coin-out amount). Upon the amount of coin-out reaching or exceeding the threshold coin-out amount, the gaming system causes one or more of such events or conditions to occur. In another such embodiment, a dynamic award modification event, a game triggering event, a game element accumulation event, a secondary game triggering event, a dynamic award triggering event, and/or a partial dynamic award triggering event occurs based on an amount of virtual currency-out. In this embodiment, the gaming system determines if an amount of virtual currency-out reaches or exceeds a designated amount of virtual currency-out (i.e., a threshold virtual currency-out amount). Upon the amount of virtual currency-out reaching or exceeding the threshold virtual currency-out amount, the gaming system causes one or more of such events or conditions to occur. In different embodiments, the threshold coin-out amount and/or the threshold virtual currency-out amount is predetermined, randomly determined, determined based on a user's status (such as determined through a player tracking system), determined based on a generated symbol or symbol combination, determined based on a random determination by the server, determined based on a random determination at the EGM, determined based on one or more side wagers placed, determined based on the primary game wager, determined based on time (such as the time of day) or determined based on any other suitable method or criteria.

In different embodiments, a dynamic award modification event, a game triggering event, a game element accumulation event, a secondary game triggering event, a dynamic award triggering event, and/or a partial dynamic award triggering event occurs based on a predefined variable reaching a defined parameter threshold. For example, when the 500,000$^{th}$ user has played an EGM (ascertained from a player tracking system), one or more of such events or conditions occur. In different embodiments, the predefined parameter thresholds include a length of time, a length of time after a certain dollar amount is hit, a wager level threshold for a specific device (which EGM is the first to contribute $250,000), a number of EGMs active, or any other parameter that defines a suitable threshold.

In different embodiments, a dynamic award modification event, a game triggering event, a game element accumulation event, a secondary game triggering event, a dynamic award triggering event, and/or a partial dynamic award triggering event occurs based on a quantity of games played. In this embodiment, a quantity of games played is set for when one or more of such events or conditions will occur. In one embodiment, such a set quantity of games played is based on historic data.

In different embodiments, a dynamic award modification event, a game triggering event, a game element accumulation event, a secondary game triggering event, a dynamic award triggering event, and/or a partial dynamic award triggering event occurs based on time. In this embodiment, a time is set for when one or more of such events or conditions will occur. In one embodiment, such a set time is based on historic data.

In different embodiments, a dynamic award modification event, a game triggering event, a game element accumulation event, a secondary game triggering event, a dynamic award triggering event, and/or a partial dynamic award triggering event occurs based upon gaming system operator defined user eligibility parameters stored on a player tracking system (such as via a player tracking card or other suitable manner). In this embodiment, the parameters for eligibility are defined by the gaming system operator based on any suitable criterion. In one embodiment, the gaming system recognizes the user's identification (via the player tracking system) when the user inserts or otherwise associates their player tracking card in the EGM and/or logs into the player tracking system using a mobile device, such as a personal gaming device. The gaming system determines the player tracking level of the user and if the current player tracking level defined by the gaming system operator is eligible for one or more of such events or conditions. In one embodiment, the gaming system operator defines minimum bet levels required for such events or conditions to occur based on the user's card level.

In different embodiments, a dynamic award modification event, a game triggering event, a game element accumulation event, a secondary game triggering event, a dynamic award triggering event, and/or a partial dynamic award triggering event occurs based on a system determination, including one or more random selections by the server. For example, as described above, the gaming system tracks all active EGMs and the wagers they placed, wherein based on the EGM's state as well as one or more wager pools associated with the EGM, the gaming system determines whether to one or more of such events or conditions will occur. In one such embodiment, the user who consistently places a higher wager is more likely to be associated with an occurrence of one or more of such events or conditions than a user who consistently places a minimum wager. It should be appreciated that the criteria for determining whether a user is in active status or inactive status for determining if one or more of such events occur may the same as, substantially the same as, or different than the criteria for determining whether a user is in active status or inactive status for another one of such events to occur.

In different embodiments, a dynamic award modification event, a game triggering event, a game element accumulation event, a secondary game triggering event, a dynamic award triggering event, and/or a partial dynamic award triggering event occurs based on a determination of if any numbers allotted to an EGM match a randomly selected number. In this embodiment, upon or prior to each play of each EGM, an EGM selects a random number from a range of numbers and during each primary game, the EGM allocates the first N numbers in the range, where N is the number of credits bet by the user in that primary game. At the end of the primary game, the randomly selected number is compared with the numbers allocated to the user and if a match occurs, one or more of such events or conditions occur.

It should be appreciated that while described as one or more of a dynamic award modification event, a game triggering event, a game element accumulation event, a secondary game triggering event, a dynamic award triggering event, and/or a partial dynamic award triggering event occurring in association with one or more displayed aspects of the play of the game, in certain embodiments, a dynamic award modification event, a game triggering event, a game element accumulation event, a secondary game triggering event, a dynamic award triggering event, and/or a partial dynamic award triggering event may alternatively or additionally occur and game elements may be accumulated and/or redeemed in association with one or more supplemental aspects of the play of the game and/or one or more occurrences independent of the play of the game. In different embodiments, a dynamic award modification event, a game triggering event, a game element accumulation event, a secondary game triggering event, a dynamic award triggering event, and/or a partial dynamic award triggering event occurs and a quantity of game elements are accumulated and/or redeemed in association with one or more of: the initiation of the play of the game, such as in association with a wager placed (or an amount of the wager placed) on the play of the game; a non-game related interaction tracked by the gaming system, such as an event occurring during a play of a sporting event which is tracked by the gaming system; a deposit of an amount of funds; an identification of a user (or a designated user); any user (or a designated user) placing a wager (regardless of the wager amount); any user (or a designated user) placing a side-wager (regardless of the side-wager amount); any user (or a designated user) engaging an input device of the EGM to cause a generation of an outcome; a triggering of a play of a bonus game; an activation of a bonus game display; an activation of a community award generator; a generation of any outcome (or a designated outcome) in a bonus game; any user (or a designated user) engaging an input device of the EGM to make a selection in a game; an amount of time elapsed; any event which is tracked for a group of EGMs; any event which includes a group of EGMs working together for each occurrence of such tracked event; any event which is tracked for a group of users; any event which includes a group of users working together for each occurrence of such tracked event; and/or any suitable event which occurs in association with a user's gaming experience. It should be further appreciated that in various embodiments, a dynamic award modification event, a game triggering event, a game element accumulation event, a secondary game triggering event, a dynamic award triggering event, and/or a partial dynamic award triggering event may occur responsive to any suitable event which occurs in association with: (a) one or more plays of one or more primary games, (b) one or more plays of one or more bonus games, or (c) one or more occurrences which are independent of any primary or bonus games played. Accordingly, any action, any inaction, and/or any decision the user makes in association with their gaming experience may lead to a dynamic award modification event, a game triggering event, a game element accumulation event, a secondary game triggering event, a dynamic award triggering event, and/or a partial dynamic award triggering event and the accumulation and/or redemption of a quantity of game elements.

It should be appreciated that any suitable manner of causing a dynamic award modification event, a game triggering event, a game element accumulation event, a secondary game triggering event, a dynamic award triggering event, and/or a partial dynamic award triggering event to occur may be implemented in accordance with the gaming system and method disclosed herein. It should be further appreciated that one or more of the above-described triggers pertaining to a dynamic award modification event, a game triggering event, a game element accumulation event, a secondary game triggering event, a dynamic award triggering event, and/or a partial dynamic award triggering event occurring may be combined in one or more different embodiments.

It should be appreciated that in different embodiments, one or more of: when a dynamic award modification event, a game triggering event, a game element accumulation event, a secondary game triggering event, a dynamic award triggering event, and/or a partial dynamic award triggering event occurs; a quantity of dynamic awards to maintain; one or more attributes of one or more dynamic awards; a quantity of game elements to accumulate in association with a game element accumulation event; which game elements to accumulate in association with a game element accumulation event; one or more attributes of one or more game elements; an amount of a partial dynamic award; an amount to modify a dynamic award with a partial dynamic award; and/or any determination disclosed herein is/are predetermined, randomly determined, randomly determined based on one or more weighted percentages, determined based on a generated symbol or symbol combination, determined independent of a generated symbol or symbol combination, determined based on a random determination by the server, determined independent of a random determination by the server, determined based on a random determination at the gaming system, determined independent of a random determination at the gaming system, determined based on at least one play of at least one game, determined independent of at least one play of at least one game, determined based on a user's selection, determined independent of a user's selection, determined based on one or more side wagers placed, determined independent of one or more side wagers placed, determined based on the user's primary game wager, determined independent of the user's primary game wager, determined based on time (such as the time of day), determined independent of time (such as the time of day), determined based on an amount of coin-in accumulated in one or more pools, determined independent of an amount of coin-in accumulated in one or more pools, determined based on a status of the user (i.e., a player tracking status), determined independent of a status of the user (i.e., a player tracking status), determined based on one or more other determinations disclosed herein, determined independent of any other determination disclosed herein or determined based on any other suitable method or criteria.

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more servers; (b) one or more electronic gaming machines such as those located on a casino floor; and/or (c) one or more personal gaming devices. Thus, in various embodiments, the gaming system of the present disclosure includes: (a) one or more electronic gaming machines in combination with one or more servers; (b) one or more personal gaming devices in combination with one or more servers; (c) one or more personal gaming devices in combination with one or more electronic gaming machines; (d) one or more personal gaming devices, one or more electronic gaming machines, and one or more servers in combination with one another; (e) a single electronic gaming machine; (f) a plurality of electronic gaming machines in combination with one another; (g) a single personal gaming device; (h) a plurality of personal gaming devices in combination with one another; (i) a single server; and/or (j) a plurality of servers in combination with one another. For brevity and clarity and unless specifically stated otherwise, "EGM" as used herein represents one EGM or a plurality of EGMs, "personal gaming device" as used herein represents one personal gaming device or a plurality of personal gaming devices, and "server" as used herein represents one server or a plurality of servers.

As noted above, in various embodiments, the gaming system includes an EGM (or personal gaming device) in combination with a server. In such embodiments, the EGM (or personal gaming device) is configured to communicate with the server through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a server through a data network.

In certain embodiments in which the gaming system includes an EGM (or personal gaming device) in combination with a server, the server is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the server. The at least one processor of that EGM (or personal gaming device) is configured to execute the events, messages, or commands represented by such data or signals in conjunction with the operation of the EGM (or personal gaming device). Moreover, the at least one processor of the server is configured to transmit and receive data or signals representing events, messages, commands, or any other suitable information between the server and the EGM (or personal gaming device). The at least one processor of the server is configured to execute the events, messages, or commands represented by such data or signals in conjunction with the operation of the server. One, more than one, or each of the functions of the server may be performed by the at least one processor of the EGM (or personal gaming device). Further, one, more than one, or each of the functions of the at least one processor of the EGM (or personal gaming device) may be performed by the at least one processor of the server.

In certain such embodiments, computerized instructions for controlling any games (such as any primary or base games and/or any secondary or bonus games) displayed by the EGM (or personal gaming device) are executed by the server. In such "thin client" embodiments, the server remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the server to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a server, computerized instructions for controlling any primary or base games displayed by the EGM (or personal gaming device) are communicated from the server to the EGM (or personal gaming device) in a thick client configuration, and computerized instructions for controlling any secondary or bonus games or other functions displayed by the EGM (or personal gaming device) are executed by the server in a thin client configuration.

In certain embodiments in which the gaming system includes: (a) an EGM (or personal gaming device) configured to communicate with a server through a data network; and/or (b) a plurality of EGMs (or personal gaming devices) configured to communicate with one another through a data network, the data network is a local area network (LAN) in which the EGMs (or personal gaming devices) are located substantially proximate to one another and/or the server. In one example, the EGMs (or personal gaming devices) and the server are located in a gaming establishment or a portion of a gaming establishment.

In other embodiments in which the gaming system includes: (a) an EGM (or personal gaming device) configured to communicate with a server through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the server. For example, one or more of the EGMs (or personal gaming devices) are located: (a) in an area of a gaming establishment different from an area of the gaming establishment in which the server is located; or (b) in a gaming establishment different from the gaming establishment in which the server is located. In another example, the server is not located within a gaming establishment in which the EGMs (or personal gaming devices) are located. In certain embodiments in which the data network is a WAN, the gaming system includes a server and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a server through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the server identifies a user before enabling that user to place any wagers on any plays of any wagering games. In one example, the server identifies the user by requiring a user account of the user to be logged into via an input of a unique username and password combination assigned to the user. The server may, however, identify the user in any other suitable manner, such as by validating a player tracking identification number associated with the user; by reading a player tracking card or other smart card inserted into a card reader (as described below); by validating a unique user identification number associated with the user by the server; or by identifying the EGM (or personal gaming device), such as by identifying the MAC address or the IP address of the Internet facilitator. In various embodiments, once the server identifies the user, the server enables placement of one or more wagers on one or more plays of one or more primary or base games and/or one or more secondary or bonus games, and displays those plays via the Internet browser of the EGM (or personal gaming device).

The server and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for users to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with users.

Figure 3:
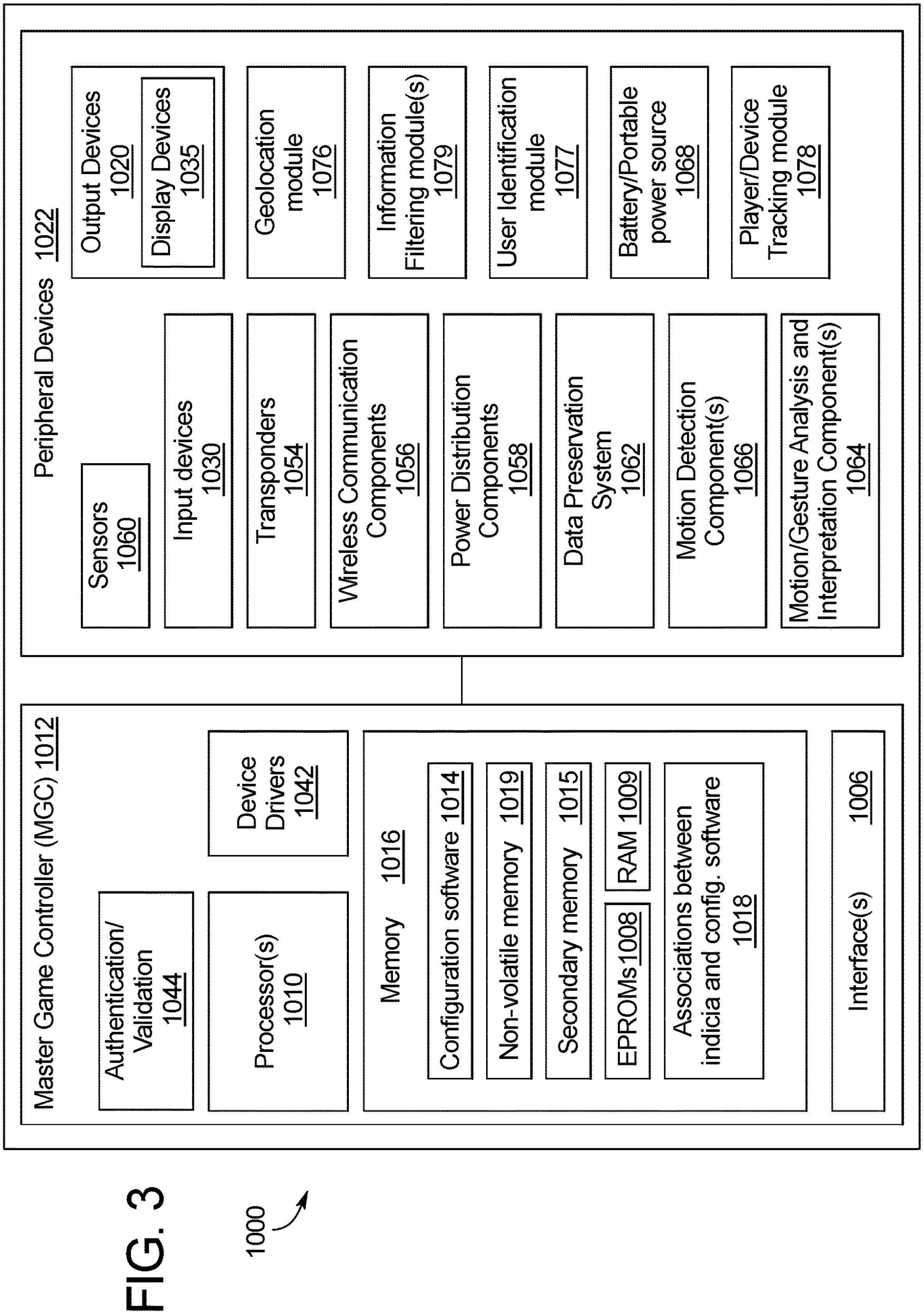
FIG. 3 is a schematic block diagram of one embodiment of an electronic configuration of an example electronic gaming machine of the present disclosure.
Figure 4A:
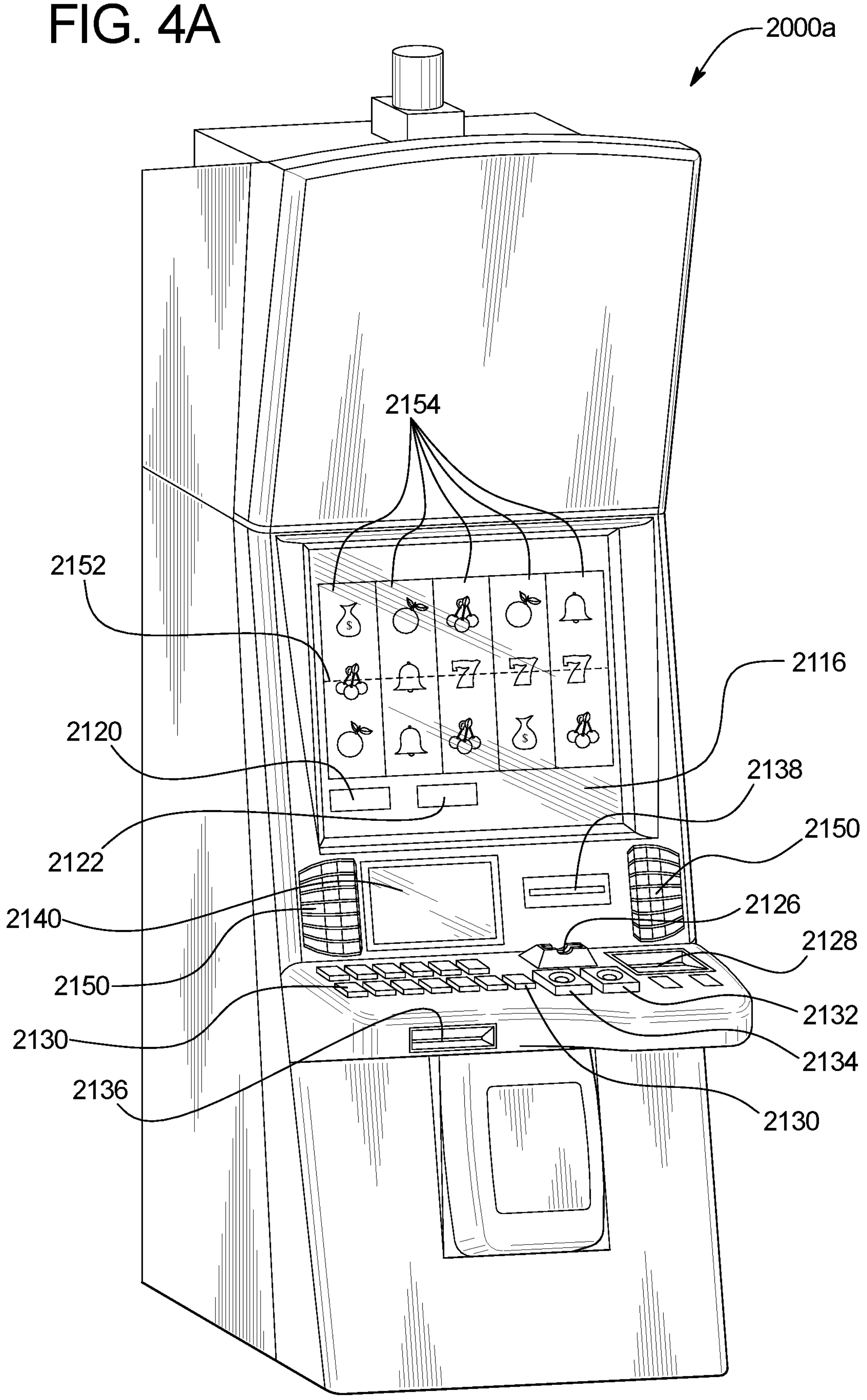
FIGS. 4A and 4B are perspective views of example alternative embodiments of an electronic gaming machine of the present disclosure.
Figure 4B:
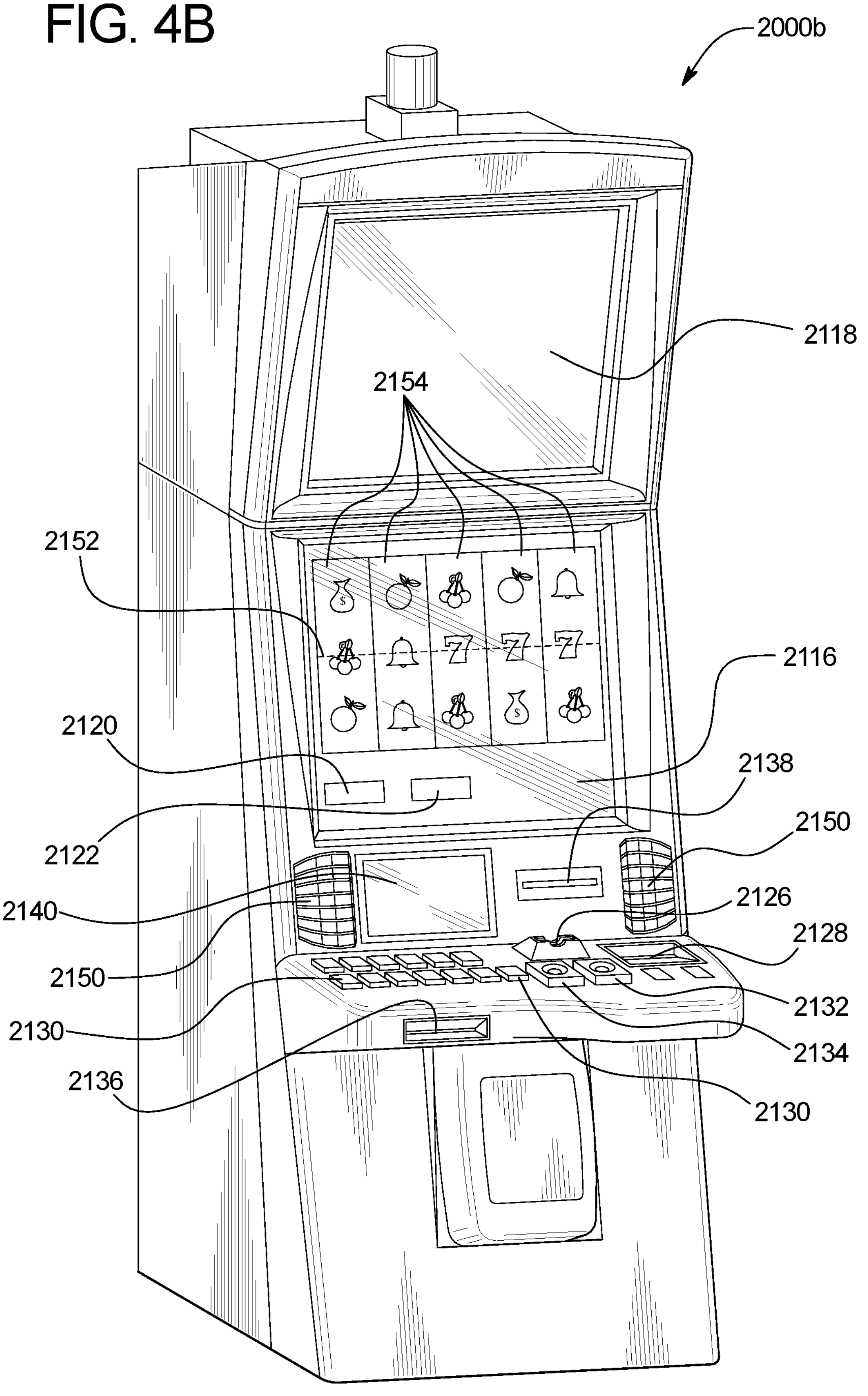
Figure 4C:
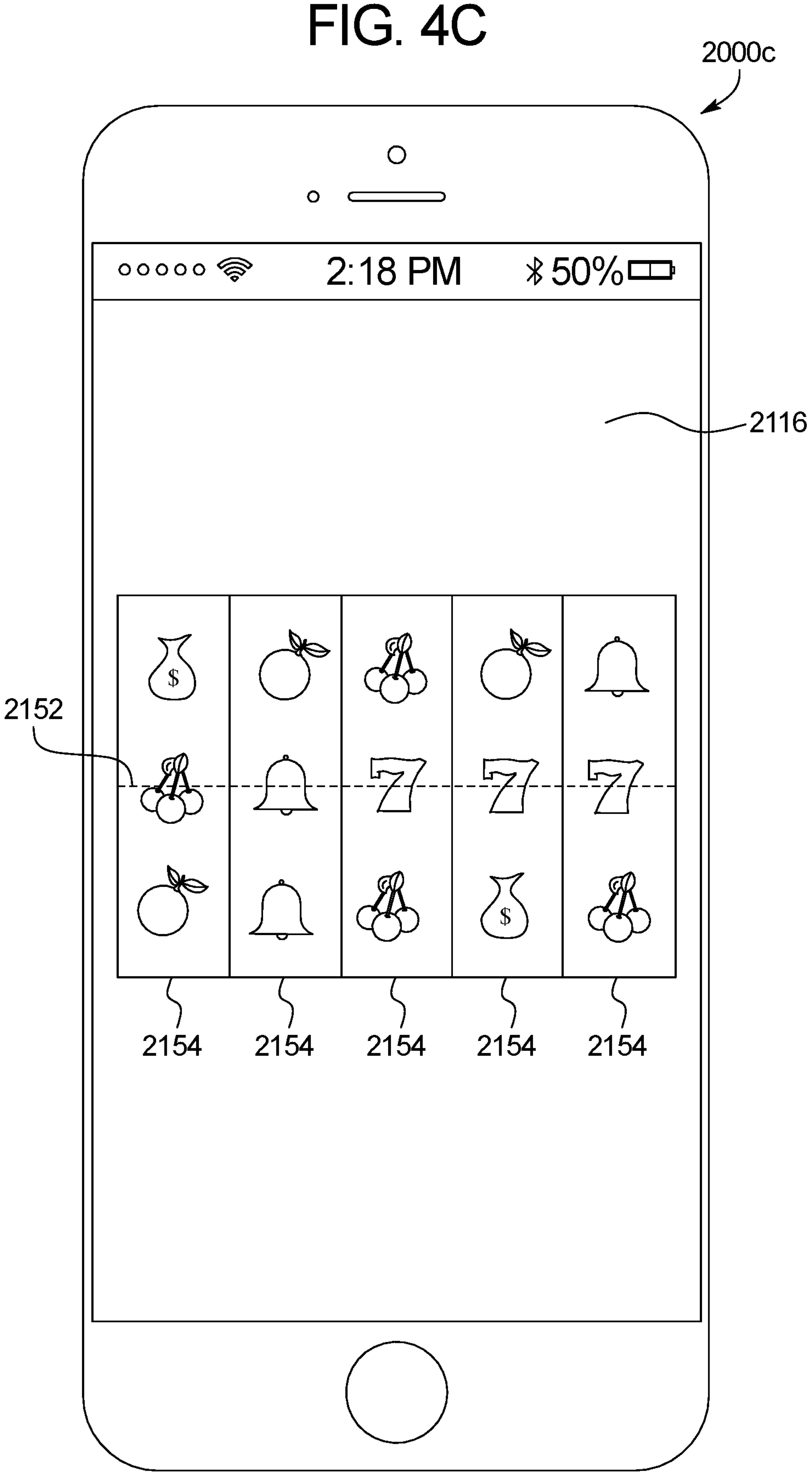
FIG. 4C is a front view of an example personal gaming device of the present disclosure.

FIG. 3 is a block diagram of an example EGM 1000 and FIGS. 4A and 4B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 4C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a user uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one user/device tracking module 1078; and (14) at least one information filtering module 1079.

The at least one output device 1020 includes at least one display device 1035 configured to display any game(s)

displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a user's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 4A includes a central display device 2116, a player tracking display 2140, a credit display 2120, and a bet display 2122. The example EGM 2000*b* illustrated in FIG. 4B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the user. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 4A and 4B each include a ticket printer and dispenser 2136.

In certain embodiments, rather than dispensing bills, coins, or a physical ticket having a monetary value to the user following receipt of an actuation of the cashout device, the payout device is configured to cause a payment to be provided to the user in the form of an electronic funds transfer, such as via a direct deposit into a bank account, a casino account, or a prepaid account of the user; via a transfer of funds onto an electronically recordable identification card or smart card of the user; or via sending a virtual ticket having a monetary value to an electronic device of the user.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 4A and 4B each include a plurality of speakers 2150. In another such embodiment, the EGM provides dynamic sounds coupled with attractive multimedia images displayed on one or more of the display devices to provide an audio-visual representation or to otherwise display full-motion video with sound to attract users to the EGM. In certain embodiments, the EGM displays a sequence of audio and/or visual attraction messages during idle periods to attract potential users to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a user identification card reader into which a user identification card is inserted to fund the EGM; or (f) any suitable combination thereof. The example EGMs 2000*a* and 2000*b* illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a user, such as a mobile phone, a radio frequency identification tag, or any other suitable wired or wireless device, to retrieve relevant information associated with that user to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a user appropriately funds the EGM and places a wager, the EGM activates the game play activation device to enable the user to actuate the game play activation device to initiate a play of a game on the EGM (or another suitable sequence of events associated with the EGM). After the EGM receives an actuation of the game play activation device, the EGM initiates the play of the game. The example EGMs **2000*a* and 2000*b* illustrated in FIGS. 4A and 4B each include a game play activation device in the form of a game play initiation button 2132**. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a user and the user has a positive (i.e., greater-than-zero) credit balance, the EGM initiates a payout associated with the user's credit balance. The example EGMs **2000*a* and 2000*b* illustrated in FIGS. 4A and 4B each include a cashout device in the form of a cashout button 2134**.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs **2000*a* and 2000*b* illustrated in FIGS. 4A and 4B each include a plurality of such buttons 2130**.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs **2000*a* and 2000*b* illustrated in FIGS. 4A and 4B each include a card reader 2138**. The card reader is configured to read a user identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., users, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected user movements and/or gestures to determine appropriate user input information relating to the detected user movements and/or gestures. For example, in one embodiment, the at least one motion/gesture analysis and interpretation component 1064 is configured to perform one or more of the following functions: analyze the detected gross motion or gestures of a user; interpret the user's motion or gestures (e.g., in the context of a casino game being played) to identify instructions or input from the user; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000*a* and 2000*b* illustrated in FIGS. 4A and 4B, the EGM has a support structure, housing, or cabinet that provides support for a plurality of the input devices and the output devices of the EGM. Further, the EGM is configured such that a user may operate it while standing or sitting. In various embodiments, the EGM is positioned on a base or stand, or is configured as a pub-style tabletop game (not shown) that a user may operate typically while sitting. As illustrated by the different example EGMs 2000*a* and 2000*b* shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a user; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a user.

As generally explained above, in various embodiments in which the gaming system includes a server and a changeable EGM, the at least one memory device of the server stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the server is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the server to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the gaming system includes a server and an EGM, the EGM is configured to communicate with the server for monitoring purposes only. In such embodiments, the EGM determines the game outcome(s) and/or award(s) to be provided in any of the manners described above, and the server monitors the activities and events occurring on the EGM. In one such embodiment, the gaming system includes a real-time or online accounting and gaming information system configured to communicate with the server. In this embodiment, the accounting and gaming information system includes: (a) a user database configured to store user profiles, (b) a player tracking module configured to track users (as described below), and (c) a credit system configured to provide automated transactions.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 4B includes a payline 2152 and a plurality of reels 2154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of user excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable users of those EGMs to work in conjunction with one another, such as by enabling the users to play together as a team or group, to win one or more awards. In other such embodiments, the EGMs enable users of those EGMs to compete against one another for one or more awards. In one such embodiment, the EGMs enable the users of those EGMs to participate in one or more gaming tournaments for one or more awards.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a user's gaming activity. In one such embodiment, the player tracking system does so through the use of player tracking cards. In this embodiment, a user is issued a user identification card that has an encoded user identification number that uniquely identifies the user. When the user's playing tracking card is inserted into a card reader of the gaming system to begin a gaming session, the card reader reads the user identification number off the player tracking card to identify the user. The gaming system timely tracks any suitable information or data relating to the identified user's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more users, the player tracking system includes the user's account number, the user's card number, the user's first name, the user's surname, the user's preferred name, the user's player tracking ranking, any promotion status associated with the user's player tracking card, the user's address, the user's birthday, the user's anniversary, the user's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the user must first access a gaming website via an Internet browser of the personal gaming device or execute an application (commonly called an "app") installed on the personal gaming device before the user can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the user before enabling game play on the personal gaming device (or, in some embodiments, before enabling monetary wager-based game play on the personal gaming device). In these embodiments, the user must identify herself to the one or more servers, such as by inputting the user's unique username and password combination, providing an input to a biometric sensor (e.g., a fingerprint sensor, a retinal sensor, a voice sensor, or a facial-recognition sensor), or providing any other suitable information.

Once identified, the one or more servers enable the user to establish an account balance from which the user can draw credits usable to wager on plays of a game. In certain embodiments, the one or more servers enable the user to initiate an electronic funds transfer to transfer funds from a bank account to the user's account balance. In other embodiments, the one or more servers enable the user to make a payment using the user's credit card, debit card, or other suitable device to add money to the user's account balance. In other embodiments, the one or more servers enable the user to add money to the user's account balance via a peer-to-peer type application, such as PayPal or Venmo. The one or more servers also enable the user to cash out the user's account balance (or part of it) in any suitable manner, such as via an electronic funds transfer, by initiating creation of a paper check that is mailed to the user, or by initiating printing of a voucher at a kiosk in a gaming establishment.

In certain embodiments, the one or more servers include a payment server that handles establishing and cashing out users' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the user's account balance can cover the desired wager (i.e., includes a monetary balance at least equal to the desired wager).

If the payment server determines that the user's account balance cannot cover the desired wager, the payment server notifies the game server, which then instructs the personal gaming device to display a suitable notification to the user that the user's account balance is too low to place the desired wager. If the payment server determines that the user's account balance can cover the desired wager, the payment server deducts the desired wager from the account balance and notifies the game server. The game server then determines an outcome and any associated award for the play of the game. The game server notifies the payment server of any nonzero award, and the payment server increases the user's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the user to play games on the EGM remotely via the personal gaming device. In certain embodiments, the gaming system includes a geo-fence system that enables tethered game play within a particular geographic area but not outside of that geographic area.

In certain embodiments, the gaming system is configured to communicate with a social network server that hosts or partially hosts a social networking website via a data network (such as the Internet) to integrate a user's gaming experience with the user's social networking account. This enables the gaming system to send certain information to the social network server that the social network server can use to create content (such as text, an image, and/or a video) and post it to the user's wall, newsfeed, or similar area of the social networking website accessible by the user's connections (and in certain cases the public) such that the user's connections can view that information. This also enables the gaming system to receive certain information from the social network server, such as the user's likes or dislikes or the user's list of connections. In certain embodiments, the gaming system enables the user to link the user's user account to the user's social networking account(s). This enables the gaming system to, once it identifies the user and initiates a gaming session (such as via the user logging in to a website (or an application) on the user's personal gaming device or via the user inserting the user's player tracking card into an EGM), link that gaming session to the user's social networking account(s). In other embodiments, the gaming system enables the user to link the user's social networking account(s) to individual gaming sessions when desired by providing the required login information.

For instance, in one embodiment, if a user wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the user's wall (or other suitable area) of the social networking website for the user's connections to see (and to entice them to play). In another embodiment, if a user joins a multiuser game and there is another seat available, the gaming system sends that information to the social network sever to enable the server to create associated content (such as text indicating a vacancy for that particular game) and to post that content to the user's wall (or other suitable area) of the social networking website for the user's connections to see (and to entice them to fill the vacancy). In another embodiment, if the user consents, the gaming system sends advertisement information or offer information to the social network server to enable the social network server to create associated content (such as text or an image reflecting an advertisement and/or an offer) and to post that content to the user's wall (or other suitable area) of the social networking website for the user's connections to see. In another embodiment, the gaming system enables the user to recommend a game to the user's connections by posting a recommendation to the user's wall (or other suitable area) of the social networking website.

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the user, the EGM stores the pre-power failure state in a non-volatile memory, returns to that state upon restoration of power, and provides the award to the user. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a user of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the user's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a user is required to make a number of selections on a video display screen. When a malfunction has occurred after the user has made one or more selections, the EGM may be restored to a state that shows the graphical presentation just before the malfunction including an indication of selections that have already been made by the user. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a user may decide that in a previous game of chance that they did not receive credit for an award that they believed they won. The game history information may be used to reconstruct the state of the EGM before, during, and/or after the disputed game to demonstrate whether the user was correct or not in the user's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. An electronic gaming machine comprising:
- a housing comprising an access door;
- a security monitoring circuit supported by the housing;
- a display device supported by the housing;
- a processor; and
- a memory device that stores a plurality of instructions that, when executed by the processor, cause the processor to:
  - determine a first display state of the electronic gaming machine by causing a display, by the display device, of a progressive award comprising a plurality of single-digit values that form a multi-digit value, and
  - responsive to an opening of the access door being detected via the security monitoring circuit following the determination of the first display state of the electronic gaming machine:
    - disable any occurrence of a modification event,
    - store data associated with first display state of the electronic gaming machine, the stored data comprising the progressive award comprising the plurality of single-digit values that form the multi-digit value, and
    - following at least a closing of the access door detected via the security monitoring circuit:
      - load the stored data to reconstitute the first display state of the electronic gaming machine,
      - enable an occurrence of the modification event, and
      - following the reconstitution of the first display state of the electronic gaming machine:
        - responsive to a first occurrence of the modification event, determine a second display state of the electronic gaming machine by causing a display, by the display device, of a modification of at least one of the single-digit values of the multi-digit value, and
        - responsive to an occurrence of a first triggering event:
          - determine a third display state of the electronic gaming machine by causing a display, by the display device, of a value of a partial progressive award that is based on at least one, but less than all, of the single-digit values of the multi-digit value, and
          - determine a fourth display state of the electronic gaming machine by causing a display, by the display device, of a further modification, based on the value of the partial progressive award, of the multi-digit value.

2. The electronic gaming machine of claim 1, wherein the first triggering event occurs based on at least one of the single-digit values of the multi-digit value corresponding with at least one single-digit value associated with at least one accumulated element and at least one of the single-digit values of the multi-digit value not corresponding with any single-digit values associated with any accumulated elements.

3. The electronic gaming machine of claim 1, wherein an ordered plurality of less than all of the single-digit values that form the multi-digit value form the value of the partial progressive award.

4. The electronic gaming machine of claim 1, wherein the memory device stores a plurality of further instructions that, when executed by the processor responsive to an occurrence of a second triggering event, cause the processor to, determine a fifth display state of the electronic gaming machine by causing a display, by the display device, of a modification of the multi-digit value to a reset value.

5. The electronic gaming machine of claim 4, wherein the second triggering event occurs based on each of the single-digit values of the multi-digit value corresponding with at least one single-digit value associated with at least one accumulated element.

6. The electronic gaming machine of claim 1, wherein the further modification of the multi-digit value comprises a display, by the display device, of a decrease of the multi-digit value by the value of the partial progressive award.

7. The electronic gaming machine of claim 1, wherein the multi-digit value is associated with a maximum quantity of occurrences of further modifications during a period of time.

8. An electronic gaming machine comprising:
a housing comprising an access door;
a security monitoring circuit supported by the housing;
a display device supported by the housing;
a processor; and
a memory device that stores a plurality of instructions that, when executed by the processor, cause the processor to:
determine a first display state of the electronic gaming machine by causing a display, by the display device, of a first reset value, and
responsive to an opening of the access door being detected via the security monitoring circuit following the determination of the first display state of the electronic gaming machine:
disable any occurrence of an increase event,
store data associated with first display state of the electronic gaming machine, the stored data comprising the first reset value, and
following at least a closing of the access door detected via the security monitoring circuit:
load the stored data to reconstitute the first display state of the electronic gaming machine,
enable an occurrence of the increase event, and
following the reconstitution of the first display state of the electronic gaming machine:
responsive to a first occurrence of the increase event, determine a second display state of the electronic gaming machine by causing a display, by the display device, of a second value, the second value being greater than the first reset value, and
responsive to an occurrence of a first triggering event when the second value is displayed:
determine a third display state of the electronic gaming machine by causing a display, by the display device, of a third value, and
thereafter, determine a fourth display state of the electronic gaming machine by causing a display, by the display device, of a fourth value being a second reset value greater than the first reset value and based on the second value modified by the third value.

9. The electronic gaming machine of claim 8, wherein the second value comprises a multi-digit value formed from a plurality of single-digit values and the third value comprises at least one of, but not each of, the single-digit values that form the multi-digit value.

10. The electronic gaming machine of claim 9, wherein the fourth value is based on the plurality of single-digit values of the second value not part of the third value.

11. The electronic gaming machine of claim 8, wherein the first reset value comprises a first quantity of single-digit values, the second value comprises a second, different quantity of single-digit values and the third value comprises a third quantity of single-digit values different from the first quantity and different from the second quantity.

12. The electronic gaming machine of claim 8, wherein the first reset value comprises a first quantity of single-digit values, the second value comprises a second, different quantity of single-digit values and the fourth value comprises a third quantity of single-digit values different from the first quantity and different from the second quantity.

13. The electronic gaming machine of claim 8, wherein the memory device comprises a plurality of further instructions that when executed by the processor after an occurrence of a second triggering event when the second value is displayed, cause the processor to determine a fifth display state of the electronic gaming machine by causing a display, by the display device, of the first reset value.

14. An electronic gaming machine comprising:
a housing comprising an access door;
a security monitoring circuit supported by the housing;
a display device supported by the housing;
a processor; and
a memory device that stores a plurality of instructions that, when executed by the processor, cause the processor to:
determine a first display state of the electronic gaming machine by causing a display, by the display device, of a first amount, wherein a first quantity of single-digit values form the first amount, and
responsive to an opening of the access door being detected via the security monitoring circuit following the determination of the first display state of the electronic gaming machine:
disable any occurrence of an element accumulation event,
store data associated with first display state of the electronic gaming machine, the stored data comprising the first quantity of single-digit values that form the first amount, and
following at least a closing of the access door detected via the security monitoring circuit:
load the stored data to reconstitute the first display state of the electronic gaming machine,
enable an occurrence of the element accumulation event, and
following the reconstitution of the first display state of the electronic gaming machine:
responsive to each occurrence of the element accumulation event, accumulate an element associated with a single-digit value,
responsive to an occurrence of a first triggering event when a second quantity of single-digit values that form part of the first amount correspond with single-digit values associated with accumulated elements:
determine a second display state of the electronic gaming machine by causing a display, by the display device, of a second amount based on the second quantity of single-digit values that form part of the first amount, the second quantity of single-digit values being less than the first quantity of single-digit values, and the second quantity of single-digit values that form part of the first amount form the second amount,
cause a second triggering event to occur in association with the second amount, and
determine a third display state of the electronic gaming machine by causing a display, by the display device, of a modification of the first amount based on the second amount.

15. The electronic gaming machine of claim 14, wherein the memory device stores a plurality of further instructions that, when executed by the processor responsive to the occurrence of the first triggering event when the first quantity of single-digit values that form the first amount correspond with single-digit values associated with accumulated elements, cause the processor to determine a fourth display state of the electronic gaming machine by causing a display, by the display device, of a third triggering event in association with the first amount.

16. The electronic gaming machine of claim 14, wherein the memory device stores a plurality of further instructions that, when executed by the processor responsive to the occurrence of the first triggering event when none of the first quantity of single-digit values that form the first amount correspond with any single-digit values associated with any accumulated elements, cause the processor to not cause any third triggering event to occur in association with the occurrence of the first triggering event.

17. The electronic gaming machine of claim 14, wherein the memory device stores a plurality of further instructions that, when executed by the processor responsive to an occurrence of an amount modification event, cause the processor to modify the first quantity of single-digit values that form the first amount.

18. The electronic gaming machine of claim 17, wherein the memory device stores a plurality of further instructions that, when executed by the processor responsive to the occurrence of the amount modification event, cause the processor to modify at least two single-digit values of the first quantity of single-digit values that form the first amount.

19. The electronic gaming machine of claim 14, wherein the memory device stores a plurality of further instructions that, when executed by the processor responsive to the occurrence of the first triggering event when a third quantity of single-digit values that form part of the first amount correspond with single-digit values associated with accumulated elements, cause the processor to determine a third amount based on the third quantity of single-digit values that form part of the first amount, cause the second triggering event to occur in association with the third amount, and modify the first amount based on the third amount, the third quantity of single-digit values being different from the first quantity of single-digit values and different from the second quantity of single-digit values.

20. The electronic gaming machine of claim 14, wherein the memory device stores a plurality of further instructions that, when executed by the processor responsive to the occurrence of the first triggering event, cause the processor to determine a fourth display state of the electronic gaming machine by causing a display, by the display device, of any single-digit values associated with any accumulated elements.

* * * * *